US008286885B1

(12) United States Patent
Zehr et al.

(10) Patent No.: US 8,286,885 B1
(45) Date of Patent: *Oct. 16, 2012

(54) HANDHELD ELECTRONIC BOOK READER DEVICE HAVING DUAL DISPLAYS

(75) Inventors: Gregg Zehr, Los Gatos, CA (US); Symon J. Whitehorn, Los Gatos, CA (US)

(73) Assignee: Amazon Technologies, Inc., Reno, NV (US)

(*) Notice: Subject to any disclaimer, the term of this patent is extended or adjusted under 35 U.S.C. 154(b) by 196 days.

This patent is subject to a terminal disclaimer.

(21) Appl. No.: 12/817,961

(22) Filed: Jun. 17, 2010

Related U.S. Application Data

(63) Continuation of application No. 11/277,893, filed on Mar. 29, 2006, now Pat. No. 7,748,634.

(51) Int. Cl.
*G06K 19/06* (2006.01)
(52) U.S. Cl. ........................... 235/492; 235/375
(58) Field of Classification Search .................. 235/492, 235/375; 455/566
See application file for complete search history.

(56) References Cited

U.S. PATENT DOCUMENTS

| | | | |
|---|---|---|---|
| 2,414,653 | A | 1/1947 | Lookholder |
| D226,196 | S | 1/1973 | Lilgenwall |
| 4,287,676 | A | 9/1981 | Weinhaus |
| 4,319,097 | A | 3/1982 | Liautaud |
| D274,798 | S | 7/1984 | O'Hara et al. |
| 4,789,301 | A | 12/1988 | Osborne et al. |
| 4,815,683 | A | 3/1989 | Ferrante |
| 5,045,637 | A | 9/1991 | Sato et al. |
| 5,097,388 | A | 3/1992 | Buist et al. |
| D325,571 | S | 4/1992 | Sakaguchi et al. |
| 5,189,698 | A | 2/1993 | Hakanen |
| 5,301,224 | A | 4/1994 | Major |
| 5,417,575 | A * | 5/1995 | McTaggart .................... 434/317 |
| D359,753 | S | 6/1995 | Salinas et al. |
| 5,460,414 | A | 10/1995 | Sargis |
| 5,477,510 | A | 12/1995 | Ukita |
| D366,067 | S | 1/1996 | Mowrey |
| 5,487,616 | A | 1/1996 | Ichbiah |
| D370,235 | S | 5/1996 | Wood |
| 5,534,888 | A | 7/1996 | Lebby et al. |

(Continued)

FOREIGN PATENT DOCUMENTS

KR 3002497510000 12/1999

(Continued)

OTHER PUBLICATIONS

Non-Final Office Action for U.S. Appl. No. 11/693,686, mailed on Nov. 8, 2011, John Johnston, "Mounting Accessories to an Electronic Device", 26 pages.

(Continued)

*Primary Examiner* — Thien M Le
(74) *Attorney, Agent, or Firm* — Lee & Hayes, PLLC

(57) ABSTRACT

A handheld electronic book device is configured with dual displays. The device includes a first display for presenting visible representations of textual or graphic content related to the electronic book. The device also includes a second display positioned alongside the first display. The second display includes a plurality of graphic elements that correspond to portions of the first display. Also, the second display is responsive to user input to one of the graphic elements to perform an action on the content that is shown in the portion of the first display that corresponds to the one element.

20 Claims, 13 Drawing Sheets

U.S. PATENT DOCUMENTS

| | | | |
|---|---|---|---|
| 5,550,754 | A | 8/1996 | McNelley et al. |
| 5,566,098 | A | 10/1996 | Lucente et al. |
| D375,515 | S | 11/1996 | Takeda et al. |
| D377,930 | S | 2/1997 | Sekino et al. |
| 5,609,488 | A * | 3/1997 | McTaggart .................... 434/317 |
| 5,660,488 | A | 8/1997 | Miller |
| 5,661,635 | A | 8/1997 | Huffman et al. |
| 5,663,748 | A | 9/1997 | Huffman et al. |
| 5,696,982 | A | 12/1997 | Tanigawa et al. |
| D390,211 | S | 2/1998 | Yates et al. |
| 5,761,485 | A | 6/1998 | Munyan |
| 5,825,617 | A | 10/1998 | Kochis et al. |
| 5,847,698 | A | 12/1998 | Reavey et al. |
| 5,850,998 | A | 12/1998 | Parsey et al. |
| 5,914,707 | A | 6/1999 | Kono |
| 5,944,574 | A | 8/1999 | Small et al. |
| 5,971,636 | A | 10/1999 | Mensick |
| 5,991,594 | A | 11/1999 | Froeber et al. |
| 6,021,306 | A * | 2/2000 | McTaggart .................... 434/317 |
| D421,744 | S | 3/2000 | Ono |
| 6,037,954 | A | 3/2000 | McMahon |
| 6,049,450 | A | 4/2000 | Cho et al. |
| 6,061,050 | A | 5/2000 | Allport et al. |
| 6,068,194 | A * | 5/2000 | Mazur ............................ 235/492 |
| D426,547 | S | 6/2000 | Khovaylo et al. |
| 6,107,988 | A | 8/2000 | Phillipps |
| 6,111,527 | A | 8/2000 | Susel |
| 6,133,580 | A * | 10/2000 | Sun ................................ 250/566 |
| D433,460 | S | 11/2000 | Griffin et al. |
| D437,002 | S | 1/2001 | Wudtke et al. |
| 6,181,344 | B1 | 1/2001 | Tarpenning et al. |
| 6,219,227 | B1 | 4/2001 | Trane |
| 6,233,141 | B1 | 5/2001 | Lee et al. |
| D443,613 | S | 6/2001 | Do et al. |
| D444,466 | S | 7/2001 | Nishida |
| D449,606 | S | 10/2001 | Lee et al. |
| 6,297,945 | B1 | 10/2001 | Yamamoto |
| 6,313,828 | B1 | 11/2001 | Chombo |
| 6,320,591 | B1 | 11/2001 | Griencewic |
| D454,870 | S | 3/2002 | Lee et al. |
| 6,398,178 | B1 | 6/2002 | Azola et al. |
| D460,493 | S | 7/2002 | Griffin et al. |
| 6,473,058 | B1 | 10/2002 | Hotomi et al. |
| 6,473,069 | B1 | 10/2002 | Gerpheide |
| D466,115 | S | 11/2002 | Hawkins et al. |
| 6,529,185 | B1 | 3/2003 | Armstrong |
| 6,529,218 | B2 | 3/2003 | Ogawa et al. |
| D481,036 | S | 10/2003 | Wentt |
| 6,632,094 | B1 | 10/2003 | Falcon et al. |
| D482,359 | S | 11/2003 | Skillman et al. |
| 6,642,909 | B1 | 11/2003 | Oliva |
| D490,119 | S | 5/2004 | Griffin et al. |
| D490,422 | S | 5/2004 | Iwama et al. |
| D492,304 | S | 6/2004 | Nishida |
| 6,757,551 | B2 | 6/2004 | Newman et al. |
| 6,766,332 | B2 | 7/2004 | Miyazaki et al. |
| D496,654 | S | 9/2004 | Burroughs |
| 6,798,649 | B1 | 9/2004 | Olodort et al. |
| D499,095 | S | 11/2004 | Balarezo |
| 6,867,763 | B2 | 3/2005 | Griffin et al. |
| 6,876,354 | B1 | 4/2005 | Terasaki et al. |
| 6,882,326 | B2 | 4/2005 | Hirayama et al. |
| 6,886,036 | B1 | 4/2005 | Santamaki et al. |
| 6,894,893 | B2 | 5/2005 | Hidesawa |
| 6,933,928 | B1 | 8/2005 | Lilienthal |
| 6,937,464 | B2 | 8/2005 | Adams et al. |
| 6,941,160 | B2 | 9/2005 | Otsuka et al. |
| D511,162 | S | 11/2005 | Majumder |
| 6,970,866 | B1 | 11/2005 | Pravetz et al. |
| 7,009,596 | B2 | 3/2006 | Seet et al. |
| D524,308 | S | 7/2006 | Lai |
| 7,098,896 | B2 | 8/2006 | Kushler et al. |
| D528,106 | S | 9/2006 | Lee et al. |
| D529,024 | S | 9/2006 | Daw et al. |
| 7,113,111 | B2 | 9/2006 | Tyneski et al. |
| D529,909 | S | 10/2006 | Daw et al. |
| D530,322 | S | 10/2006 | Rak et al. |
| D533,172 | S | 12/2006 | Lee et al. |
| D533,173 | S | 12/2006 | Lee et al. |
| 7,153,212 | B1 | 12/2006 | Karten et al. |
| 7,238,024 | B2 | 7/2007 | Rehbein et al. |
| 7,298,851 | B1 | 11/2007 | Hendricks et al. |
| D558,202 | S | 12/2007 | Choi et al. |
| 7,304,635 | B2 | 12/2007 | Seet et al. |
| 7,313,255 | B2 | 12/2007 | Machida et al. |
| D561,723 | S | 2/2008 | Kim et al. |
| 7,355,591 | B2 | 4/2008 | Sugimoto |
| 7,374,142 | B2 | 5/2008 | Carnevali |
| D572,393 | S | 7/2008 | Johnston et al. |
| 7,460,108 | B2 | 12/2008 | Tamura |
| D585,902 | S | 2/2009 | Hobbs et al. |
| D586,803 | S | 2/2009 | Whitehorn et al. |
| D591,741 | S | 5/2009 | Whitehorn et al. |
| 7,548,220 | B2 | 6/2009 | Silverbrook |
| 7,564,425 | B2 | 7/2009 | Martinez et al. |
| 7,605,798 | B2 | 10/2009 | Komatsu |
| 2001/0020932 | A1 | 9/2001 | Merminod et al. |
| 2001/0050658 | A1 | 12/2001 | Adams |
| 2002/0003874 | A1 | 1/2002 | Peiker |
| 2002/0019950 | A1 | 2/2002 | Huffman et al. |
| 2002/0050981 | A1 | 5/2002 | Nuovo |
| 2002/0087555 | A1 | 7/2002 | Murata |
| 2002/0184189 | A1 | 12/2002 | Hay et al. |
| 2003/0014674 | A1 | 1/2003 | Huffman et al. |
| 2003/0020687 | A1 | 1/2003 | Sowden et al. |
| 2003/0043095 | A1 | 3/2003 | Silverbrook |
| 2003/0048250 | A1 | 3/2003 | Boon et al. |
| 2003/0048251 | A1 | 3/2003 | Liang et al. |
| 2003/0058265 | A1 | 3/2003 | Robinson et al. |
| 2003/0058521 | A1 | 3/2003 | Kawai |
| 2003/0069812 | A1 | 4/2003 | Yuen et al. |
| 2003/0071784 | A1 | 4/2003 | Sato et al. |
| 2003/0071800 | A1 | 4/2003 | Vincent et al. |
| 2003/0107603 | A1 | 6/2003 | Clapper |
| 2003/0122773 | A1 | 7/2003 | Washio et al. |
| 2003/0133304 | A1 | 7/2003 | Wallach |
| 2003/0193795 | A1 | 10/2003 | Brown |
| 2004/0026605 | A1 | 2/2004 | Lee et al. |
| 2004/0047152 | A1 | 3/2004 | Hung et al. |
| 2004/0148574 | A1 | 7/2004 | Ohtani et al. |
| 2004/0196210 | A1 | 10/2004 | Nagatsuka et al. |
| 2004/0201633 | A1 | 10/2004 | Barsness et al. |
| 2005/0012723 | A1 | 1/2005 | Pallakoff |
| 2005/0052419 | A1 | 3/2005 | Burroughs |
| 2005/0091431 | A1 | 4/2005 | Olodort et al. |
| 2005/0146506 | A1 | 7/2005 | Goszyk et al. |
| 2005/0190083 | A1 | 9/2005 | Tyneski et al. |
| 2005/0247845 | A1 | 11/2005 | Li et al. |
| 2005/0264540 | A1 | 12/2005 | Niwa |
| 2005/0284993 | A1 | 12/2005 | Ternus et al. |
| 2006/0020469 | A1 | 1/2006 | Rast |
| 2006/0041839 | A1 | 2/2006 | Kassan |
| 2006/0098899 | A1 | 5/2006 | King et al. |
| 2006/0187142 | A1 | 8/2006 | Lesniak |
| 2006/0194181 | A1 | 8/2006 | Rosenberg |
| 2006/0209012 | A1 | 9/2006 | Hagood |
| 2006/0232565 | A1 | 10/2006 | Drevnig |
| 2006/0236263 | A1 | 10/2006 | Bathiche et al. |
| 2006/0281058 | A1 | 12/2006 | Mangoaela |
| 2007/0002024 | A1 | 1/2007 | Goszyk |
| 2007/0013662 | A1 | 1/2007 | Fauth |
| 2007/0035661 | A1 | 2/2007 | Resner et al. |
| 2007/0097490 | A1 | 5/2007 | Kanbe |
| 2007/0111177 | A1 | 5/2007 | Rifkin |
| 2007/0133014 | A1 | 6/2007 | Lee |
| 2007/0206262 | A1 | 9/2007 | Zhou |
| 2007/0273637 | A1 | 11/2007 | Zhou et al. |
| 2008/0040692 | A1 | 2/2008 | Sunday et al. |
| 2008/0076103 | A1 | 3/2008 | Wallace |
| 2008/0141180 | A1 | 6/2008 | Reed et al. |
| 2008/0145828 | A1 | 6/2008 | Yu |
| 2008/0198184 | A1 | 8/2008 | Schellingerhout et al. |
| 2008/0215895 | A1 | 9/2008 | Hendricks |
| 2008/0259057 | A1 | 10/2008 | Brons |
| 2008/0295039 | A1 | 11/2008 | Nguyen et al. |
| 2009/0021478 | A1 | 1/2009 | Lin et al. |
| 2009/0102805 | A1 | 4/2009 | Meijer et al. |

| | | | |
|---|---|---|---|
| 2009/0186647 | A1 | 7/2009 | Smart et al. |
| 2009/0313020 | A1 | 12/2009 | Koivunen |
| 2010/0070281 | A1 | 3/2010 | Conkie et al. |
| 2011/0039602 | A1 | 2/2011 | McNamara et al. |

FOREIGN PATENT DOCUMENTS

| | | |
|---|---|---|
| KR | 30-2004-0025424 | 8/2004 |
| WO | WO9120072 A1 | 12/1991 |

OTHER PUBLICATIONS

Non-Final Office Action for U.S. Appl. No. 12/553,080, mailed on Decemeber 6, 2011, John T. Kim et al., "Touch-Screen User Interface", 11 pages.

U.S. Appl. No. 29/246,295 (AM2-0024US), filed Mar. 29, 2006, entitled "Wedge-Shaped Electronic Media Reader", Symon J. Whitehorn, Gregg Elliott Zehr.

Apple MacBook Pro Deisgn, retrieved on Mar. 16, 2007 at <<http://www.apple.com/macbookpro/design.html>>, 1 page.

Bookeen, "Cybook: the neverending book", retrieved from the internet on Oct. 22, 2007 at <<http://www.bookeen.com/ebook/ebook-reading-device.aspx>>, 2 pages.

Captain, "Word Wrap", Jun. 2007, Popular Science, p. 21.

"E Ink: Hanlin eReader V2", retrieved from the internet on Oct. 22, 2007 at <<http://www.jinke.com.cn/compagesql/English/embedpro/prodetail.asp?id=20>>, 2 pages.

"E-book device", Wikipedia, retrieved from the internet on Oct. 22, 2007 at <<http://en.wikipedia.org/wiki/E-book_device>>, 2 pages.

"eBook User's Guide Version 1.0", Thomson Consumer Electronics, Inc. NuvoMedia, Inc. 1995-2000.

"Amazon Kindle: meet Amazon's e-book reader", retrieved from the internet on Nov. 20, 2007 at <<http://www.engadget.com/2006/09/11/amazon-kindle-meet-amazons-e-book-reader/, 9 pages.

"Hanlin eReader V2: Readman", Apr. 2006, Tianjin Jinke Electronics, Co. LTD 2006, 1 page.

Retrieved from the internet on Oct. 22, 2007 at <<http://upload.wikimedia.org/wikipedia/en/9/91/Iriverbook2.jpg>>, 1 page.

"iLiad", Wikipedia, retrieved from the internet on Oct. 22, 2007 at <<http://en.wikipedia.org/wiki/ILiad>>, 3 pages.

"Image:Laptop-ebook.jpg", Wikipedia, retrieved from the internet on Oct. 22, 2007 at <<http://en.wikipedia.org/wiki/Image:Laptop-ebook.jpt>>, 2 pages.

"Image:Iriverbook2.jpg", Wikipedia, retrieved from the internet on Oct. 22, 2007 at <<http://en.wikipedia.org/wiki/Image:Iriverbook2.jpg>>, 3 pages.

"New to E-Books", Club Lighthouse Publishing, retrieved from the internet on Oct. 22, 2007 at <<http://www.clublighthousepublishing.com/NEW_TO_%20EBOOKS_PAGE.htm>>, 3 pages.

NUUT e-Book, "NUUT Keyword", retrieved from the internet on Oct. 22, 2007 at <<http://nuutbook.com/html/detail.asp>>, 3 pages.

"Planet eBook—Tool Description for Planet Ebook by NetLibrary", available as early as Jun. 13, 2006 at <<http://www.planetebook.com/mainpage.asp?webpageid=15&tbtoolid=1069>>, Planet eBook 2007, 2 pages.

"Sony Librie EBR-1000EP", Wikipedia, retrieved from the internet on Oct. 22, 2007 at <<http://en.wikipedia.org/wiki/Libri%C3%A9>>, 2 pages "Sony Reader", Wikipedia, retrieved from the internet on Oct. 22, 2007 at <<http://en.wikipedia.org/wiki/Sony_Reader>>. 4 pages.

Sony Reader, "06 Accessories", retrieved on the internet on Mar. 16, 2007 at <<http://www.learningcenter.sony.us/assets/itpd/reader/index.html>>, 1 page.

Sony Reader Blog, "Specifications", retrieved on the internet on Mar. 16, 2007 at <<http://www.thesonyreader.com/sony-reader-specifications>>, 12 pages.

Sony Reader details and pics, "Engadget", retrieved on the internet on Mar. 16, 2007 at <<http://www.engadget.com/2006/01/06/sony-reader-details-and-pics/>>, 8 pages.

Sony Reader, "Revoluntionary paper-like display", retrieved on the internet on Mar. 16, 2007 at <<http://www.learningcenter.sony.us/assets/itpd/reader/reader_features.html>>, 2 pages.

"The Reader, Sony's new e-ink e-book reader—Engadget", retrieved on the internet on Mar. 16, 2007 at <<http://www.engadget.com/2006/01/04/live-shot-of-the-reader-sonys-new-e-ink-e-book-reader>>, 6 pages.

Price, et al., " XLibris: The Active Reading Machine", FX Palo Alto Laboratory, Inc., CHI 98 Summary, ACM Press, 1998, pp. 22-23., Apr. 18, 1998.

Hanlin eReader V2 , E-Ink, Tianjin Jinke Electronics Co., LTD, Tianjin, Cbina, copyright 1985-2005, jinke.com.cn, 1 page.

PCT Search Report mailed Feb. 1, 2011.

Non-Final Office Action for U.S. Appl. No. 12/553,071, mailed on Feb. 17, 2012, John T. Kim et al., "Touch-Screen User Interface" 18 pages.

Non-Final Office Action for U.S. Appl. No. 12/553,078 mailed on Feb. 17, 2012, John T. Kim et al., "Touch-Screen User Interface", 21 pages.

Office action for U.S. Appl. No. 12/553,076, mailed on Feb. 29, 2012, Kim et al., "Touch-Screen User Interface", 12 pages.

Final Office Action for U.S. Appl. No. 11/693,686, mailed on Apr. 6, 2012, John Johnston et al., "Mounting Accessories to an Electronic Device", 34 pages.

Final Office Action for U.S. Appl. No. 12/553,080, mailed on Jun. 15, 2012, John T. Kim et al., "Touch-Screen User Interface", 13 pages.

U.S. Appl. No. 11/277,879 (AM2-0030US), filed Mar. 29, 2006, entitled "Keyboard Layout for Handheld Electronic Book Reader Device," Gregg Elliott Zehr, Thomas J. Hobbs, John E. Johnston, Symon J. Whitehorn.

U.S. Appl. No. 11/277,893 (AM2-0027US), filed Mar. 29, 2006, entitled "Handheld Electronic Book Reader Device Having Dual Displays", Gregg Elliott Zehr, Symon J. Whitehorn.

U.S. Appl. No. 11/277,898 (AM2-0026US), filed Mar. 29, 2006, entitled "Page Turner for Handheld Electronic Book Reader Device", Greg Elliott Zehr, Thomas J. Hobbs, John E. Johnston, Jateen P. Parekh, Symon J. Whitehom.

U.S. Appl. No. 29/246,293 (AM2-0022US), filed Mar. 29, 2006, entitled "Electronic Media Reader Display", Symon J. Whitehom, Gregg Elliott Zehr.

U.S. Appl. No. 29/246,294 (AM2-0023US), filed Mar. 29, 2006, "Electronic Media Reader Keypad", Thomas J. Hobbs, John E. Johnston, Gregg Elliott Zehr.

* cited by examiner

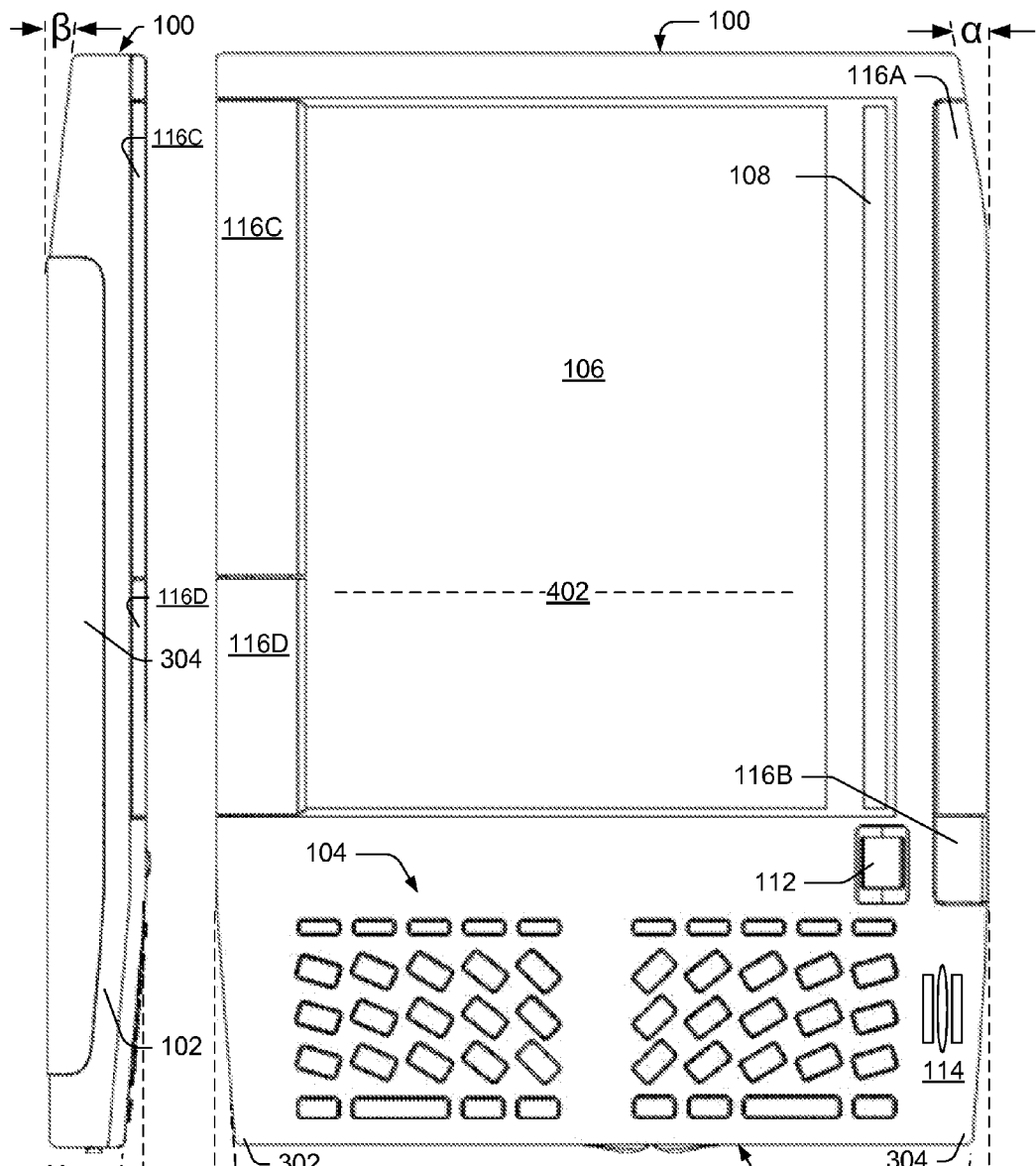
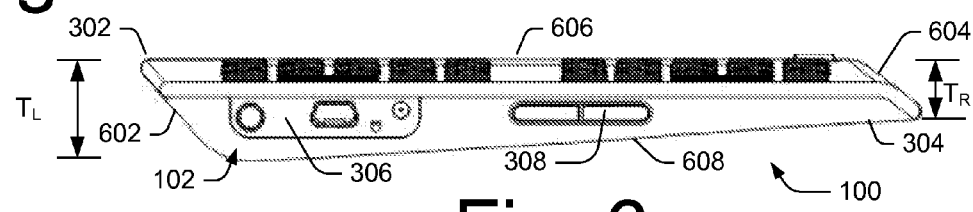
Fig. 5　Fig. 4　Fig. 6

HANDHELD ELECTRONIC BOOK READER DEVICE HAVING DUAL DISPLAYS

CROSS-REFERENCE TO RELATED APPLICATIONS

This application is a continuation of and claims priority under 35 U.S.C. 120 to U.S. patent application Ser. No. 11/277,893, filed on Mar. 29, 2006, the disclosure of which is incorporated by reference herein. This patent application is also related to U.S. patent application Ser. No. 11/277,879, titled "Keyboard Layout for Handheld Electronic Book Reader Device", U.S. patent application Ser. No. 11/277,873, titled "Handheld Electronic Book Reader Device Having Asymmetrical Shape", and U.S. patent application Ser. No. 11/277,898, titled "Page Turner for Handheld Electronic Book Reader Device". This patent application is further related to U.S. Design application Ser. No. 29/246,293, titled "Electronic Media Reader Display," now U.S. Pat. No. D591,741, U.S. Design application Ser. No. 29/246,294, titled "Electronic Media Reader Keypad," now U.S. Pat. No. D585,902, and U.S. Design application Ser. No. 29/246,295, titled "Wedge-Shaped Electronic Media Reader," now U.S. Pat. No. D586,803. The parent, of which this patent application claims priority, along with the three noted utility applications and three noted design applications, were filed concurrently on the same day of Mar. 29, 2006.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information, such as books, using electronic technologies. Books distributed using electronic technologies are commonly referred to as electronic books ("eBooks"). Various entities make eBooks available for download over ordinary Internet connections, such as broadband and dialup connections.

EBook reader devices attempt to mimic the experience of reading a conventional paper book through display of electronic information on one or more electronic displays. A typical eBook reader device is a handheld digital device having a liquid crystal display panel and enough memory and processing capability to store several eBooks. Such a device is capable of retrieving and displaying an eBook or portion of an eBook for reading.

There are some advantages to using an eBook reader device over conventional paper books. An eBook reader device is often capable of storing a number of complete unabridged eBooks. Therefore, an eBook reader containing a number of stored eBooks weighs significantly less than the same number of paper books. This makes an eBook reader a particularly attractive alternative to paper books for travel, educational purposes, and professional business use. Also, because eBooks do not require the use of paper products, they are generally offered at a lower price than their paper book counterparts. Furthermore, the use of eBook reader devices in conjunction with eBooks may be beneficial to the ecosystem, by reducing a number of books produced using paper products.

To date, however, eBook readers and the use of eBooks in general have not achieved widespread consumer acceptance. This is most likely attributable to the design and implementation particulars of conventional eBook reader devices. Awkwardness in physically handling the eBook readers may be one reason such devices have not yet gained widespread popularity. Another reason might be inconsistent or non-intuitive user interface actions that arise when a user is interacting with the eBook readers.

As such eBook readers continue to evolve, there remains a need for improving a reader's ability to hold and interact with the readers.

SUMMARY

A handheld electronic book device having dual displays is described. The device includes a first display for presenting visible representations of textual or graphic content related to the electronic book. The device also includes a second display positioned alongside the first display. The second display includes a plurality of graphic elements that correspond to portions of the first display. Also, the second display is responsive to user input to one of the graphic elements to perform an action on the content that is shown in the portion of the first display that corresponds to the one segment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a front plan view of the eBook reader device.

FIG. 5 is a side elevation view of a first side of the eBook reader device, as shown in FIG. 4.

FIG. 6 is a bottom elevation view of the eBook reader device, as shown in FIG. 4.

DETAILED DESCRIPTION

This disclosure is directed to a handheld electronic book reader device designed to allow users to read electronic content (e.g., text, graphics, multimedia, and the like), such as that found in electronic books, magazines, RSS feeds, newspapers, and the like. The electronic book reader device has a non-symmetric shape designed to approximate the feel of an open paperback book. To improve user interaction, two displays are mounted in the eBook reader device, one to present the text or graphic content and a second display to support user interface functions such as navigation, command entry, browsing, lookup functions, or the like. The eBook reader device is further equipped with a QWERTY keyboard with a unique key arrangement that facilitates improved user entry when the user is holding the device. A page turner is also provided on the eBook reader device to allow the user to turn pages with a familiar tactile motion.

These and other aspects are described below in various example implementations of an electronic device that presents electronic books, news print, electronic magazines, RSS feeds, or other forms of media content. More specifically, the description herein provides a non-limiting implementation of an electronic device in the form of an electronic book reader device.

The terms "book" and/or "eBook" as used herein include electronic or digital representations of printed works, as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps etc. Accordingly, the terms book and/or eBook may include any content that is in electronic or digital format With such eBooks, the content may be structured as virtual frames presented on the device and a user may turn or change from one virtual frame or "page" of electronic content to another. It is further noted that various aspects and features described herein may be implemented in other electronic devices or electronic readers besides eBook reader devices including, for example, portable computers, personal digital assistants (PDAs), portable gaming devices, wireless phones, and the like.

Exemplary eBook Reader Device

Figure 1:
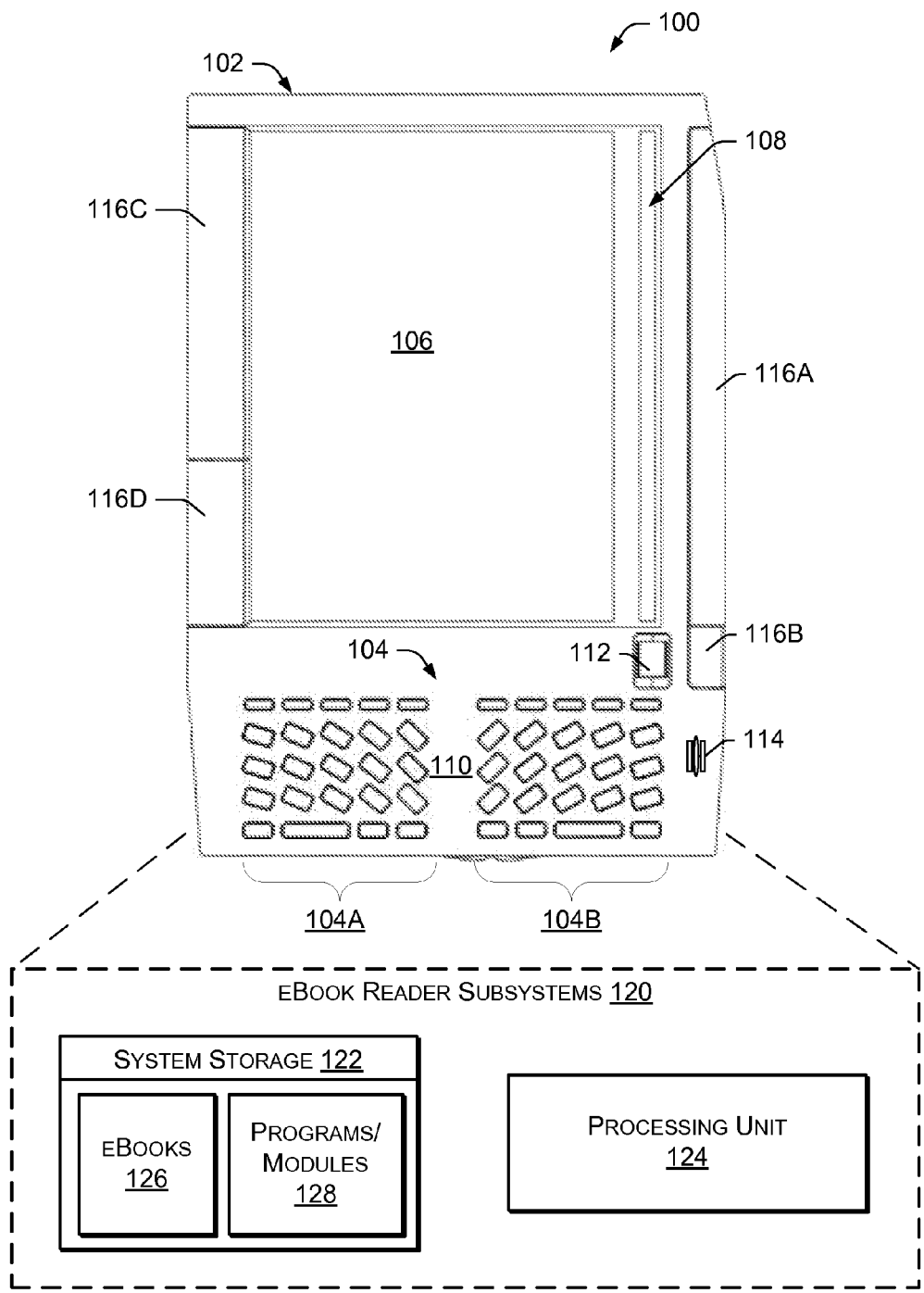
FIG. 1 illustrates one exemplary implementation of a handheld electronic book ("eBook") reader device.

FIG. 1 illustrates an exemplary device 100 with a non-symmetric shape. In one possible implementation, the device 100 is embodied as a handheld eBook reader device. The non-symmetrical shape enables the eBook reader device 100 to approximate the feel of a paperback book that is bound along its left side. As a human reader progresses through a physical paperback book, he or she may fold the read pages back around the bound spine and tuck them underneath the book. Overtime, the paperback book takes on a somewhat wedge-shaped configuration as more pages are folded back in this manner. Typically, the reader would grip the thicker part of the "wedge" in his or her left hand, and flip pages with his or her right hand. This shape will be more readily apparent with reference to FIGS. 3-11, which are described below in more detail.

The eBook reader device 100 has a body or housing 102, a keyboard 104, and a dual display system comprised of a first display 106 and a second display 108. The housing may be formed of plastic, aluminum, or other suitable material. The housing 102 may be textured or otherwise provided with tactile features to enhance gripping by a human user. Additionally, the housing may be of one-piece construction, or may be assembled from a plurality of sub-components or sub-portions.

The device keyboard 104 includes a plurality of keys. In the illustrated implementation, the keyboard includes at least 26 alphabet keys arranged in a QWERTY format as well as other function keys (such as space bar, control keys, function keys, and so forth). It is noted that the keyboard may include other arrangements of the 26 alphabet keys that do not conform to the QWERY layout. The keys are separated into two groups including a first or left-side group of keys 104A and a second or right-side group of keys 104B. The key groups 104A and 104B are separated by a space or open region 110. Individual keys are sized to accommodate a user's thumb or finger. While the keys are arranged in horizontal rows, individual keys are rotated within the rows such that keys in adjacent rows lie along arcuate paths. The key orientation facilitates ergonomic operation by a user's thumbs when the user is grasping the two lower corners of the device 100. The keyboard 104 and key orientation are described below in more detail with reference to FIGS. 13 and 14.

The first display 106 in the dual display system presents content in a human-readable format to the user. The content presented in the first display 106 may take the form of electronic books, newspapers, or other readable or viewable materials. For example, the display 106 provides the text of the electronic books and also depicts any illustrations, tables, or graphic elements that might be contained in the electronic books. In one implementation, the content display 106 employs display technology with a relatively slow refresh rate in exchange for a relatively low rate of power consumption. This tradeoff serves to maximize battery life. Further, since the display 106 may be used to depict electronic books, the content is relatively static and hence a slow-refresh rate technology may be suitable for implementing the display 106. In some implementations, the display 106 is not responsive to user input.

As one example, the display 106 may be implemented using electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display.

The second display 108 of the dual display system is a narrow screen located adjacent to the content display 106. The narrow display 108 is illustrated as being positioned to the right of the content display 106, although it may be located elsewhere in the housing 102 in other implementations. The narrow display screen 108 may be responsive to user input registered via, for example, a finger, a stylus, or other similar pointing device. Additionally, the narrow display screen 108 may enable presentation of graphic elements that correspond to content displayed in the content display 106. These graphic elements may be selected by the user in order to select the corresponding content in the display 106, as described further below. Some exemplary displays that may be used with the implementations of the narrow display 108 include organic LEDs, TFT, and PN LCD.

The narrow display screen 108 provides many diverse functions. For instance, it may present a form of user interface that enables the user to command the device to turn pages of text, scroll up or down pages of text, zoom in or zoom out, navigate to other locations in the book, or the like. In possible implementations, the narrow display 108 may be broken into segments or zones, with different ones of the segments or zones corresponding to user input in different ways. For example, the user might tap one part of the narrow display 108 to scroll in one direction, and may tap another part of the narrow display 108 to scroll in another direction. The dual display system is described below in more detail with reference to FIG. 15.

The eBook reader device 100 may also include a user input tool 112, which can be configured to support many diverse operations. For instance, the tool 112 may enable the user to flip through pages, skip chapters, operate the narrow display 108, or scroll through content on the display 106. The tool 112 may be implemented in many forms, including as a scroll wheel, a thumb wheel, a thumb stick, a sensor that detects and registers movement of a user's thumb or finger, or any other user input mechanism. In some implementations, the user input tool 112 may be operative in connection with graphic elements displayed on the narrow display 108 to enable the user to place content displayed in the content display 106 in focus. The tool 112 may also be clickable so as to select the content that is currently in focus for additional processing. Thus, the tool 112 may also be considered a selection tool.

The eBook reader device 100 may be further equipped with a page turner to facilitate the turning of pages of an electronic book. The page turner is configured to simulate a tactile riffle feel as the user flips pages in a book. In the illustrated implementation, the page turner is configured as a page turning mechanism 114 having a tactile member (e.g., a ridge or indentation) juxtaposed with one or more sensors, and sized to accommodate a user's thumb or finger. The tactile member provides the tactile feedback to the user to simulate the riffle sensation. The sensors detect speed and direction of the user's thumb or finger, thereby enabling the device to detect gestures of flipping forward or backward through one or more pages of the book. While illustrated to the right of the keyboard 104, the page turning mechanism 114 may be located in any number of locations on the device 100. The page turning mechanism 114 is described below in more detail with reference to FIGS. 16-21.

Additionally, the page turning mechanism 114 may enable a user to enter commands in a manner similar to that described with the user input tool 112. More particularly, the user may interact with either the user input tool 112 or the page turning mechanism 114 to, for example, navigate content, enter commands, browse menu items, or the like.

The term "page" as used herein refers to a collection of content that is presented at one time in the first display 106. Thus, a "page" as described herein may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display 106.

The eBook reader device 100 may also include a plurality of programmable control surfaces 116. For convenience only, FIG. 1 shows four examples of such control surfaces 116, referenced at 116A, 116B, 116C, and 116D. The control surfaces 116 may be programmed to perform any convenient functions related to operating the device 100. The control surfaces 116A and 116B may be operable with a user's right hand, for example, while the control surfaces 116C and 116D may be operable with the user's left hand.

For example only, the control surface 116A may be programmed to present a next page (or other logical unit) of content in the content display 106 when activated. The control surface 116B may be programmed to present a menu of options in the content display 106 when activated. The control surface 116C may be configured similarly the surface 116A, so as to advance the page of content shown in the content display 106. However, the control surface 116C may be operable with the left hand. Finally, the control surface 116D may be programmed to present a previous page of content in the content display 106.

It is understood that the foregoing descriptions of functions assigned to the control surfaces 116 are illustrative and non-limiting. Other functions may be assigned to one or more of the various control surfaces 116 without departing from the scope of the description herein.

The keys, tools, and turning mechanisms are merely examples of user interface elements. The eBook reader device 100 may further include other types of actuatable elements that may have dedicated or assigned operations. For instance, the device 100 may have a power on/off button, and selection keys.

As also illustrated in FIG. 1, the eBook reader device 100 has various internal components, which are defined generally by the eBook reader subsystems 120. In one implementation, the subsystems 120 include system storage 122 and a processing unit 124. The processing unit 124 interacts with the system storage 122 to facilitate operation of the eBook reader device 100. The system storage 122 may be used to store eBooks and other content 126, as well as software programs or other executable modules 128 that may be executed by the processing unit. Examples of such programs or modules might include reader programs, control modules (e.g., power management), network connection software, operating models, display drivers, sensor algorithms, page turn detectors, and the like.

Figure 2:
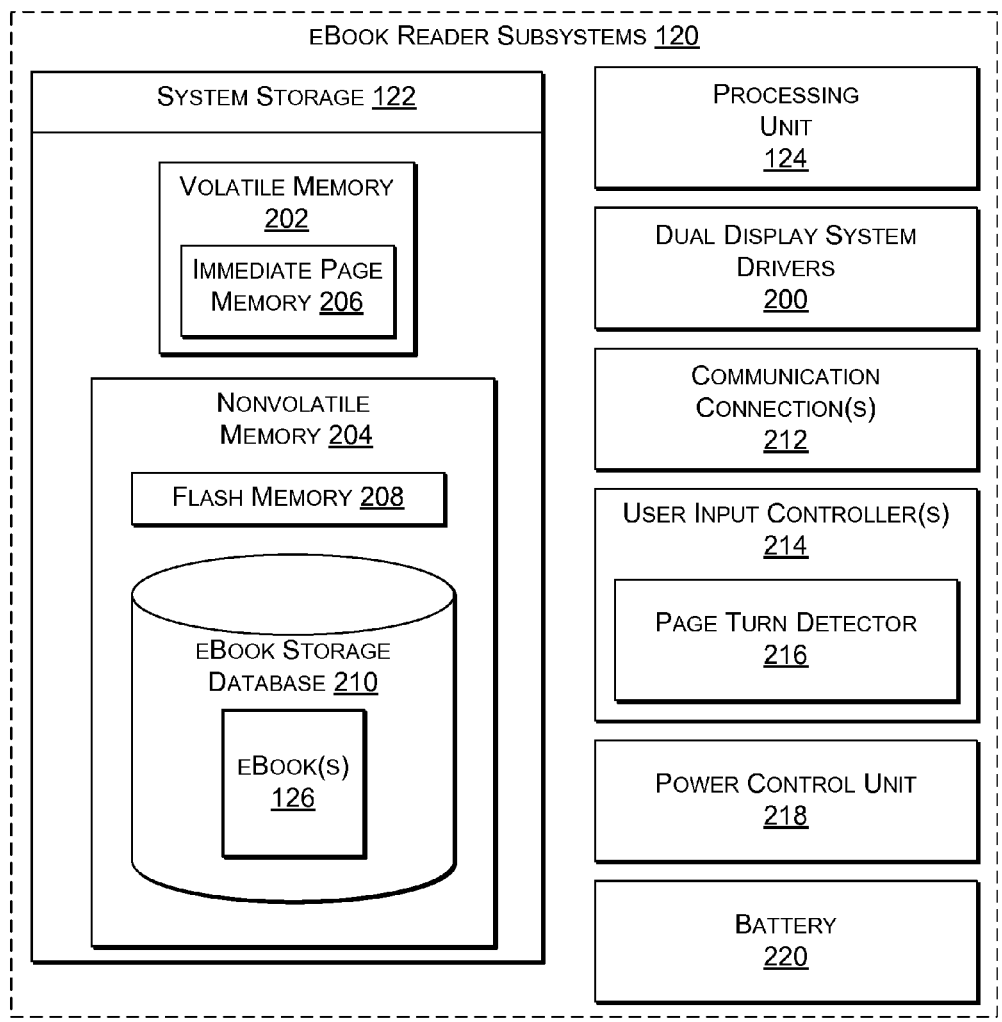
FIG. 2 is a block diagram showing exemplary components that may be implemented in the eBook reader device of FIG. 1.

FIG. 2 illustrates exemplary components that might be implemented in the eBook reader subsystems 120. In a very basic configuration, the subsystems 120 include the system storage 122, the processing unit 124, and dual display system drivers 200 for controlling eBook content output to the content display 106 as well as data or commands output to the narrow display 108. Depending on the configuration of an eBook reader device 100, the system storage 122 includes a volatile memory 202 (such as RAM) and a nonvolatile memory 204. The volatile memory 202 includes a memory portion designated as an immediate page memory 206 to temporarily store one or more pages of an electronic book. The pages held by the immediate page memory 206 are placed therein a short period before a next page request is expected.

The nonvolatile memory 204 includes a flash memory 208 that typically contains an operating system of the eBook reader device 100. The nonvolatile memory 204 also includes an eBook storage database 210 to store one or more eBooks 126 (depending one the size of the eBooks and the size of the memory) that are displayable on the display 104.

The eBook reader subsystems 120 may also include one or more communication connections 212 that allow the eBook reader device 100 to communicate with other computer systems or other devices. Electronic books and other content, as well as program modules, may be transferred to the eBook reader device 100 via the communication connection(s) 212. The communication connection(s) 212 support both wired and wireless communications with various types of networks, including the Internet. For example, the eBook reader device 100 may be equipped with an RF transceiver to facilitate wireless communication over a wireless network. The device may further include a communication connection that facilitates communication with other devices via, for example, a Bluetooth or IR connection. The communication connection(s) 212 are one example of communication media. Communication media may typically be embodied by computer readable instructions, data structures, program modules, or other data in a modulated data signal, such as a carrier wave or other transport mechanism, and includes any information delivery media.

One or more user input controllers 214 are also provided to capture user input via the keyboard 104, tool 112, page turning mechanism 114, and any other user input element on the device 100. The user input controller(s) 214 include a page turn detector 216 that detects the user's finger speed and direction when swiped across the page turning mechanism 114. The detector provides this information to the processing unit 124, which then identifies the correct page to be retrieved from the memory (either immediate page member 206 or in the storage database 210) and displays it on the content display 106. The page turn detector 216, and its operation in conjunction with the page turning mechanism 114, is described in more detail below with reference to FIG. 14. The eBook reader device 100 may also have other input device(s) such as a mouse, pen, voice input device, touch input device, and so forth.

The eBook reader subsystems 120 also include a power control unit 218 and a battery 220. The power control unit 218 operatively controls an amount of power, or electrical energy, consumed by the eBook reader device 100. Actively controlling the amount of power consumed by the reader device 100 may achieve more efficient use of electrical energy stored by the battery 220. The processing unit 124 supplies computing resources to the power control unit 218. The power control unit 218 may further include a clock/timer for accurate control of power consumed by the reader device 100.

The eBook reader device 100 may have additional features or functionality. For example, the eBook reader device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. Output device(s) such as an auxiliary display, speakers, printer, etc. may also be included.

The system storage 122 is an exemplary example of computer storage media. Thus, computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 100. Any such computer storage media may be part of the eBook reader device 100.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Non-Symmetric Shape

Figure 3:
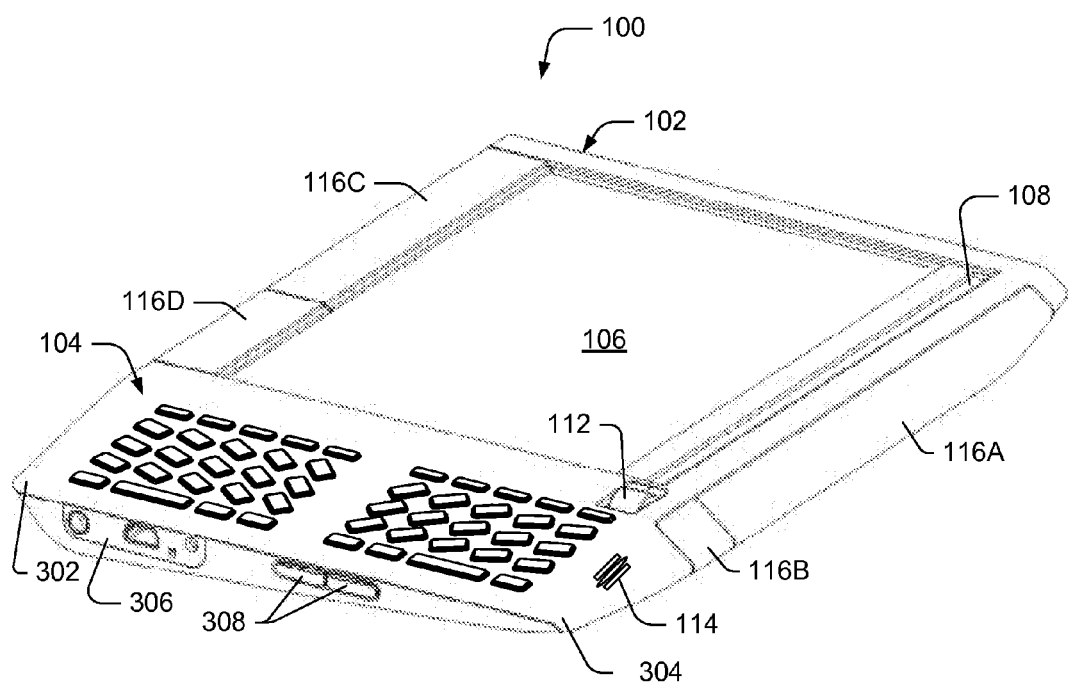
FIG. 3 is a perspective view of the eBook reader device to demonstrate its non-symmetrical shape.

FIG. 3 shows a perspective view of one exemplary implementation of the handheld eBook reader device 100. The housing 102 is designed with a non-symmetrical wedge-shaped configuration in which a left hand side 302 is thicker than the right hand side 304 of the device 100. When the user grasps the thicker left side 302 with his or her left hand, the housing 102 simulates the feel of a bound paperback book, particularly when pages that have been read are curled back around the left-side bound spine and tucked underneath the book. This leaves the right hand of the user free to interact with the device, such as the keyboard 104, narrow display 108, tool 112, and page turning mechanism 114. With the wedge-spaced configuration, the device weight may or may not be uniformly distributed across the housing, but instead the left side of the device may be heavier than the right side. The similarity of handling the device 100 as compared to a paperback book may enhance user acceptance of the eBook reader device 100. In alternative implementations, the device 100 may be constructed intentionally to achieve uniform distribution across the housing to permit reading comfort regardless of whether the reader is holding the device with her left or right hand. This uniform weighting may be achieved in many ways, including distribution of components inside the housing 102 or additional weight elements positioned on the right side of the device.

The programmable control surfaces 116 are also shown in FIG. 3. In the illustrative embodiment, the control surface 116A may be approximately the same height as the first display 106. The control surface 116B may be approximately the same height as the selection tool 112. Finally, the combined heights of the control surfaces 116C and 116D may approximately match the height of the first display 106.

The size and the positioning of the control surfaces 116 enable convenient manipulation by users having a variety of different hand and/or finger sizes. Additionally, different users may position their hands or fingers differently on the device 100, and the configuration of the control surfaces 116 enables use under a variety of different positions of hands and/or fingers.

It is noted that alternative configurations are possible without departing from the scope and spirit of the description herein. For example, the device may be configured so that the user's right hand receives the thicker portion of the device. Put differently, in FIG. 3, the housing 102 may have a thicker left side rather than right side when the device is oriented for reading. One approach to implementing this alternative configuration is to construct the housing thereof as a reverse or mirror image of the housing 102 shown in FIG. 3. This alternative configuration may be suitable for left-handed readers, for example.

The device 100 may also include ports 306, which may connect the device to receive data or power from external sources. For example, the battery 220 may be recharged by connecting an output jack from an external power supply to one of the ports 306. Another port 306 may support a wired connection to facilitate data transfer so that eBooks, other content, or program modules may be downloaded to the device 100 over the wired connection. Respective cables may be connected individually to the ports 306, or the handheld electronic book device may be engaged into a docking station adapted to provide power and/or data to the ports 306.

The eBook reader device 100 may further include one or more buttons 308 to support other operational control functions. For instance, the buttons 308 may provide power on/off, menu selection capabilities, volume control, brightness/contrast functionality, or page forward/backward functionality. These are but a few examples of the various functions that may be implemented in the device.

FIGS. 4-6 show the front, left side, and bottom views of the eBook reader device 100, respectively. The housing 102, keyboard 104, content display 106, narrow display 108, tool 112, page turning mechanism 114, and control surfaces 116A-116D are all visible on the face of the device (FIG. 4). The ports 306 and control buttons 308 are seen on the bottom (FIG. 6).

When the device 100 is oriented for reading, content presented in the display 106 may be aligned parallel with an axis 402 (FIG. 4). Additionally, the keys of keyboard 104 may be aligned in rows that are parallel with the axis 402. The thicker left side 302 and the thinner right side 304 extend along axes that are perpendicular to the axis 402. An illustrative but non-limiting height for the device 100 may be, for example, 190 mm, but may range from approximately 150 mm to approximately 200 mm. An illustrative but non-limiting width for the device 100 may be, for example, 135 mm, but may range from approximately 120 mm to approximately 150 mm. An illustrative but non-limiting weight for the device 100 may range from approximately 250 g to 300 g.

As shown in FIG. 5, certain control surfaces 116 (namely, the control surfaces 116C and 116D) are in the same plane as the displays 106 and 108. However, these control surfaces 116 lie in a different plane than the keyboard 104, since the keyboard is angled relative to the displays 106 and 106 by the angle $\mu$, which is described in detail below. The other control surfaces 116C and 116D are positioned along a surface 602 (FIG. 6) that is not coplanar with the displays 106 and 108, as will be described below in more detail.

As shown in FIG. 6, the thicker left side 302 of the wedge-shaped housing 102 has a thickness $T_L$ and the thinner right side 304 has a thickness $T_R$, where $T_R$ is less than $T_L$. In one illustrative but non-limiting implementation, the left side thickness $T_L$ may be approximately 17 mm, but may fall generally within a range of approximately 15 mm to approximately 20 mm. Also, the right side thickness $T_R$ may be approximately 10 mm, but may fall generally within a range of approximately 5 mm to 15 mm.

As further shown in FIG. 6, the housing includes a left edge surface 602 on the left side 302 and a right edge surface 604 on the right side 304. The left and right edge surfaces 602 and 604 are not perpendicular to a horizontal upper surface 606 or the slanted lower surface 608. The relationships of these surfaces are described in more detail with reference to FIGS. 10 and 11. It is noted that the relationship of thicknesses, and the relationship of the surfaces, provide the wedge-shape configuration of the eBook reader device 100. While one example is shown, other wedge-shape configurations may be used.

The angle between the upper surface 606 and the left edge surface 602 may be defined so as to enable a user to grip the left side of the reader 100 with a left hand. This angle may also enable the user to manipulate the control surfaces 116C and 116D and the left-hand portion of the keyboard 104 with a left thumb. Similarly, the angle between the lower surface 608 and the right edge surface 604 may be defined to enable the user to cradle the right side of the reader 100 with a right hand. This angle may also enable the user to manipulate the control surfaces 116A and 116B and the right-hand portion of the keyboard 104 with a right thumb.

The non-symmetrical shape of the housing 102 is further characterized by various non-right angles at three of the four corners of the device as viewed in FIG. 4. The upper right hand corner of the housing 102 may incorporate an angle $\alpha$, which defines the relationship between the vertical right edge of the housing 102 and an angled portion that meets the horizontal top edge of the housing 102. In one possible implementation, this angle $\alpha$ may be approximately 10°, but may range from approximately 5° to approximately 15°.

Turning to the lower right hand corner of the housing 102, an angle $\phi_R$ defines the relationship between the vertical right edge of the housing and an angled portion that meets the horizontal bottom edge of the housing. In one possible implementation, this angle $\phi_R$ may be approximately 4°, with a suitable range from approximately 1° to approximately 10°. At the lower left hand corner of the housing 102, an angle $\phi_L$ defines the relationship between the vertical left edge of the housing and an angled portion that meets the horizontal bottom edge of the housing. In one possible implementation, this angle $\phi_L$ may be approximately 5°, but may range from approximately 1° to approximately 10°.

Further, as shown in FIG. 5, the non-symmetrical housing 102 of the eBook reader device 100 has other sloping surfaces that contribute to the overall aesthetics and feel of the device. An angle $\beta$ defines the relationship between the flat bottom surface of the housing 102 and the sloped upper portion of the housing. In one possible implementation, this angle $\beta$ may be approximately 8°, but may range from approximately 5° to approximately 15°. An angle $\mu$, defines the relationship between the flat top surface of the housing 102 and the sloped lower portion of the housing. In one possible implementation, this angle $\beta$ may be approximately 5°, but may range from approximately 1° to approximately 15°.

Figures 7, 8, 9:
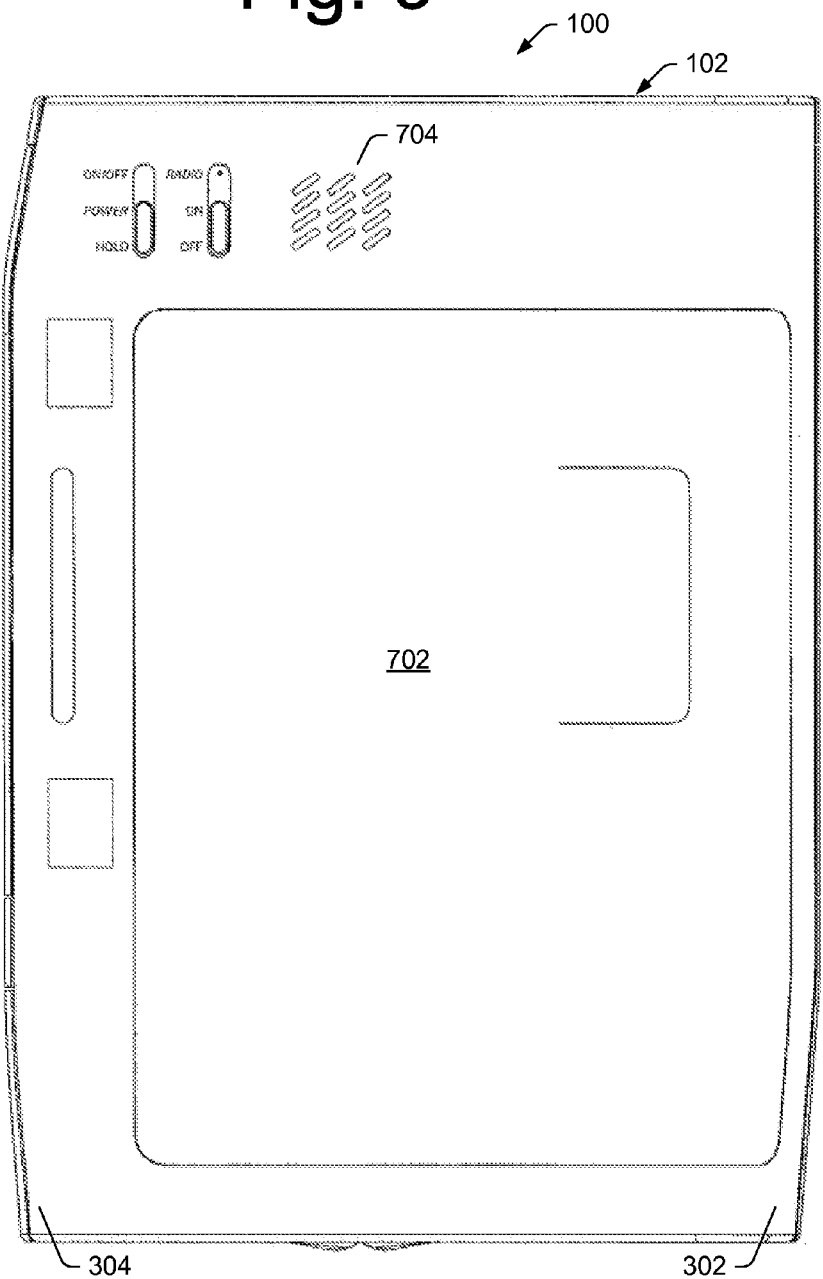
FIG. 7 is a back plan view of the eBook reader device.
FIG. 8 is a side elevation view of a second side of the eBook reader device, which is opposite the first side shown in FIG. 5.
FIG. 9 is a top elevation view of the eBook reader device.

FIGS. 7-9 show the back, right side, and bottom views of the eBook reader device 100, respectively. The housing 102 includes a panel 702, which may be removed for access to the internal components of the device, including the battery. The housing also has speaker grills 704 to emit sound from a speaker.

Figure 10:
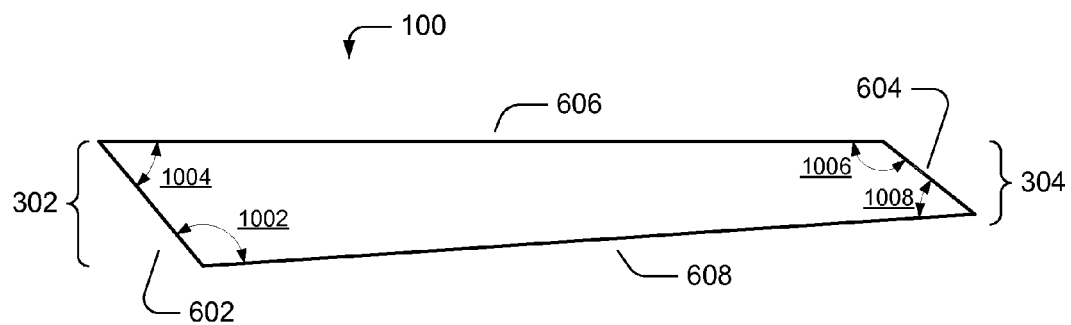
FIG. 10 is an outline diagram representing a wedge-shaped configuration of the eBook reader device, viewed as a cross-section of the eBook reader device.

FIG. 10 illustrates the wedge-shaped configuration of the eBook reader device 100. FIG. 10 may be viewed as representing a cross-sectional profile of the device, presented in a more schematic form, as compared to FIGS. 3-9. The wedge-shaped configuration is defined by angles 1002, 1004, 1006, and 1008.

Angle 1002 describes the relationship of left edge surface 602 and the slanted lower surface 608. In one example implementation, the angle 1002 is an obtuse angle in a range of 116° to 136°, with one suitable example being approximately 126°. The angular relationship between the left edge surface 602 and the horizontal upper surface 606 is referenced at 1004. In one possible implementation, the angle 1004 is an acute angle with a range of 40° to 60°, with one example being approximately 50°.

Angle 1006 describes the relationship of upper surface 606 and the right edge surface 604. In one example implementation, the angle 1006 is an obtuse angle in a range of 132° to 152°, with one suitable example being approximately 142°. The angular relationship between the right edge surface 604 and the lower surface 608 is referenced at 1008. In one possible implementation, the angle 1008 is an acute angle with a range of 32° to 52°, with one example being approximately 42°.

With the illustrated wedge shape, the device 100 approximates the feel of a paperback book whose pages have been folded back around the spine (i.e., along the thicker left side 302) after being read. The user can easily grasp the device 100 with his or her left hand along the thicker left side 302 in a manner similar to holding a paperback book with one hand. As a result of folding back the read pages, the remaining unread pages become feathered in a slanted manner, as modeled by right edge surface 604 and angles 1006 and 1008.

It is noted that the angles 1002-1008 shown in FIG. 10 are illustrative only, and may be varied without departing from the scope and spirit of the description herein. In general, any angular measurements for these four angles that result in the overall device having a non-parallelogram, wedge-shaped configuration are possible. This wedge-shaped configuration may result from the lengths of the portions 602-608 relative to one another, and/or the relationships of the various angles 1002-1008 relative to one another. It is understood that these factors may be varied in any number of ways to result in the wedge-shaped configuration shown in FIG. 10.

The configuration shown in FIG. 10 may be suitable for right-handed users. However, it is understood that the above descriptions may also be applied to implementing a device 100 and related housing 102 adapted for left-handed users. An example of such is shown in FIG. 11, which is now described.

Figure 11:
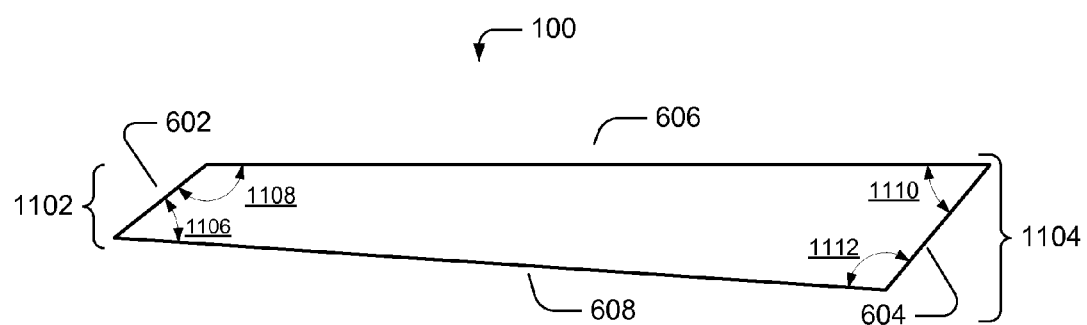
FIG. 11 is an outline diagram representing an alternative wedge-shaped configuration of the eBook reader device, viewed as a cross-section of the eBook reader device.

FIG. 11 presents a cross-section of the device 100 in block form, and provides illustrative angular values for the four angles that make up the block representation of the device 100. The device 100 as shown in FIG. 11 may be suitable for left-handed users. For convenience of illustration and description only, the device 100 shown in FIG. 11 may be visualized as a reverse configuration of the device 100 as shown in FIG. 10, where a left side 1102 is thinner than a right side 1104 and lower surface 608 slants upward from right to left. New angles 1106-1112 approximate mirror the angles shown in FIG. 10, where angle 1106 is similar in range to angle 1008, angle 1108 is similar to angle 1006, angle 1110 is similar to 1004, and angle 1112 is similar to angle 1002.

Figure 12:
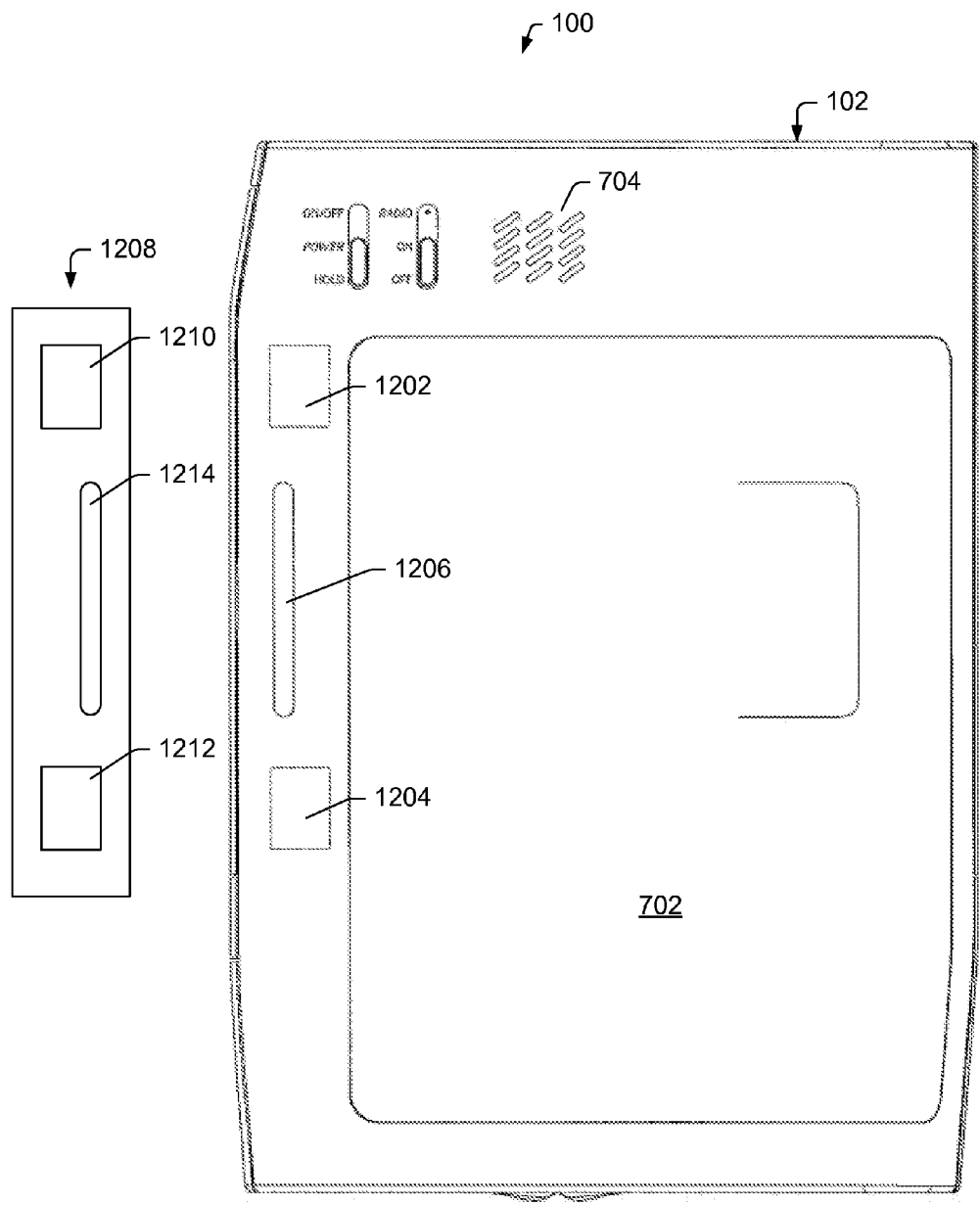
FIG. 12 is a block diagram providing a rear view of another possible implementation of the device, along with an accessory for the device.

FIG. 12 illustrates a rear view of another possible implementation of the device 100. In this implementation, the device 100 may include attachment points 1202 and 1204 for attaching an accessory to the device 100. The device 100 may also include an alignment point 1206. An illustrative accessory is shown in block form at 1208. Similar to the device 100, the accessory 1208 includes attachment points 1210 and 1212 and a complementary alignment point 1214 that coordinate with the attachment points 1202, 1204 and alignment point 1206 of the device 100. Illustrative, but non-limiting, examples of accessories that may be used with the device 100 may include a reading lamp, a foldable protective cover for the front of the device, a docking station or other general-purpose interface, a data exchange interface, an external speaker, a text-to-speech converter, an interfaces for a remote control unit, an external network port, an interface for radio-frequency (RF) communication, a power supply for providing power to the device, an accessory receiving power from the device, or the like.

The accessories may fit onto the back of the device, or may fit along the side of the device. Also, some accessories may include portions that fold over the front of the device, or that articulate so as to focus on particular portions of the device.

In one possible implementation, the attachment points 1202 and 1204 include metallic members that are located inside the housing 102, out of view. The accessory 1208 is equipped with magnetic attachment points 1210 and 1212 that respectively engage the metallic attachment points 1202 and 1204 on the device 100. The magnetic strength of the attachment points 1210 and 1212 provided by a given accessory may be varied depending on the weight and size of the accessory. Alternatively, the attachment points 1202 and 1204 on the device 100 may be made of a magnetic material. The attachment points 1210 and 1212 on the accessory 1208 may then include metallic members that engage these magnetic attachment points 1202 and 1204.

In other implementations, the attachment points may employ other complementary connecting materials. As one example, the attachment points 1202 and 1204 on the device 100 and the attachment points 1210 and 1212 on the accessory may employ Velcro®-brand materials.

The alignment point 1206 on the device may serve as a guide to help align the mating surfaces of the accessory 1208 and the device. The alignment point 1214 on the accessory 1208 is complementary to the alignment point 1206 on the device 100. In one example implementation, the alignment point 1206 on the device 100 may be a raised or embossed portion, relative to the device housing 102, that fits into a depressed or recessed area defined by the alignment point 1214. In another implementation, the alignment point 1206 on the device 100 may define a depressed or recessed area, and the alignment point 1214 on the accessory 1208 may provide an embossed or raised portion.

In any event, illustrative but non-limiting dimensions for the alignment points 1206 (on the device) and/or 1214 (on the accessory) may be 42.5 mm in length, 3.4 mm in width, and 1.2 mm in relief or depth, depending on whether the alignment point is implemented as a raised portion or as a recessed portion. The alignment points 1206 and 1214 may include a full round detail on both ends. However, it is noted that other dimensions and end details may be implemented without departing from the scope and spirit of the description herein. For example, different dimensions may be implemented depending on the shape, weight, purpose, or use of the accessory 1208. Additionally, the shapes of the alignment points 1206 and 1214 are illustrative only, and other shapes may be implemented as well.

The alignment points 1206 and 1214 may provide for both horizontal and vertical alignment of the accessory 1208 and the device 100. In some implementations, this alignment may be purely mechanical. However, in other implementations, the device 100 may provide data and/or power to the accessory 1208, or vice versa. In these latter implementations, the device 100 and the accessory 1208 may provide respective mating connectors for performing such data and/or power transfer. The alignment points 1206 and 1214 may help to align these respective connectors to facilitate secure engagement between the connectors.

In any event, the attachment points 1202-1204, the alignment point 1206, and any signal or power connectors on the device 100 may define a standard interface for any accessories 1208 that may be attachable to the device. By complying with this standard interface, those who provide the accessories 1208 may be confident that the accessories are compatible with the device 100.

It is understood that the layout and shapes of the elements shown in FIG. 12 are illustrative rather than limiting. It is expressly noted that implementations of the device 100 may include different layouts and shapes of, for example, the alignment points 1206 and/or 1214 without departing from the spirit and scope of the description herein.

Keyboard Arrangement

Figure 13:
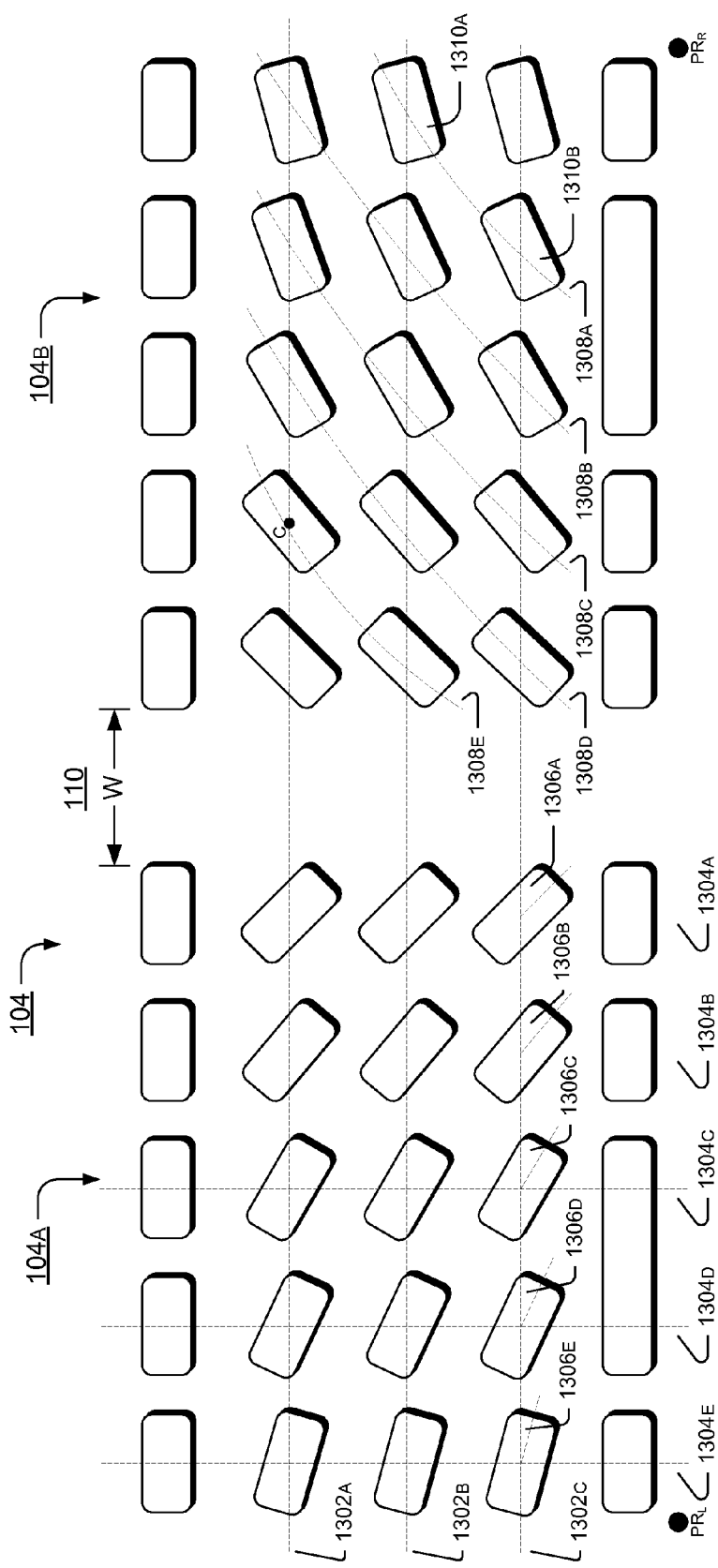
FIG. 13 is a block diagram illustrating an exemplary arrangement of keys in a keyboard of the eBook reader device.

FIG. 13 illustrates the keyboard 104 of the eBook reader device 100 in more detail. The keyboard 104 may be operative to control aspects of displaying content presented by the device 100, or to enter text, symbols, or alphanumeric characters that may represent, for example, commands, search strings, or the like. The keyboard 104 may be implemented as an alphanumeric keyboard, with individual keys for letters and numbers, supplemental keys for a space bar, <Ctrl> keys, <Alt> keys, numeric keys, function keys, and the like. In one implementation, the alphanumeric keyboard is arranged in a QWERTY layout, although other arrangements of the A-Z keys may be used. In general, the keyboard 104 provides a respective key for each letter. Numbers may be provided on separate keys, or combined with certain of the letter keys.

As shown in FIG. 13, the keyboard 104 is composed of a first group of keys 104A and a second group of keys 104B, which are arranged so that a user may readily and easily reach all of them using his or her thumbs when holding the bottom of the eBook reader device 100. The key groups 104A and 104B are separated by the region or area 110, which has a width W that is greater than a width of an individual QWERTY key in the keyboard.

For convenience of discussion and illustration only, certain descriptions are provided below with reference to either group 104A or 104B. However, it is understood that descriptions provided for either group applies equally to the other group.

As shown with the group 104A, the keys are arranged in horizontal rows, represented generally in FIG. 13 by the horizontal dashed lines 1302A, 1302B, and 1302C (collectively, horizontal rows 1302). In some implementations, the horizontal rows 1302 may be non-uniformly spaced from one another. For example, as shown in FIG. 13, the rows 1302B and 1302C are slightly closer than are rows 1302B and 1302A, although it is understood that other implementations may vary the spacing between the rows 1302.

The keys may also be arranged in vertical columns, represented generally in FIG. 13 by the vertical dashed lines 1304A, 1304B, 1304C, 1304D, and 1304E (collectively, vertical columns 1304). In some implementations, the vertical columns 1304 may be uniformly spaced from one another. For example, as shown in FIG. 13, the columns 1304A-1304E have approximately the same spacing from one another, although it is understood that other implementations may vary the spacing between the columns 1304.

Only in the interest of legibility, the columns 1304 are shown only within the group of keys 104A. However, the group of keys 104B may also be arranged in columns similarly to the group 104A, although the columns 1304 are not shown explicitly in the group 104B to avoid complicating the drawing. It is understood that all descriptions of the group 104A apply equally to the group 104B, and vice versa.

As readily appreciated from FIG. 13, the horizontal rows 1302 and the vertical columns 1304 form a grid, with individual ones of the keys being located at the intersections within this grid. More specifically, the center points of the keys may be located at these intersections. Additionally, the keys that are aligned in a given vertical column 1304 may be rotated by or oriented at a given angle, relative to the horizontal rows intersected by that given column. This given angle may vary for each of the vertical columns 1304, such that keys in each column are angled by the same amount relative to the horizontal rows 1302.

The printed circuit board structure underlying the keyboard 104 may provide electrical contact points at the approximately grid intersections shown in FIG. 13. The contact points may lie approximately under the center points of the individual keys. However, the key caps themselves may be oriented or rotated as described herein. Further, the orientation or rotation of the key caps may not affect the structure of the underlying printed circuit board.

In the illustrative but non-limiting implementation shown in FIG. 13, the three keys in the vertical column 1304A are angled at approximately 45°, as referenced at 1306A. The angle 1306A may fall within a range of approximately 40° to 50°. The three keys in the vertical column 1304B are angled at approximately 40°, as referenced at 1306B. The angle 1306B may fall within a range of approximately 35° to 45°. The three keys in the vertical column 1304C are angled at approximately 30°, as referenced at 1306C. The angle 1306C may fall within a range of approximately 25° to 35°. The three keys in the vertical column 1304D are angled at approximately 25°, as referenced at 1306D. The angle 1306D may fall within a range of approximately 20° to 30°. The three keys in the vertical column 1304E are angled at approximately 15°, as referenced at 1306E. The angle 1306E may fall within a range of approximately 10° to 20°.

As shown in FIG. 13, the angles of the keys relative to the horizontal rows 1302 decrease when viewing the columns of keys from the center of the device 100 toward the edges of the device. For example, in the group of keys 104A, the angles of keys relative to horizontal rows 1302 decrease from column 1304A to column 1304B and so on. Similarly, in the group of keys 104B, the angles of keys relative to the horizontal rows decrease when moving along the key columns from left to right.

As described above, unlike conventional keyboards, individual QWERTY keys are rotated within the rows 1302 such that keys in adjacent rows lie along generally arcuate paths. This key orientation facilitates ergonomic operation by a user's thumbs when the user is grasping the two lower corners of the device. More particularly, the QWERTY keys may be arranged generally in several arcuate configurations within each group of keys 104A and 104B. For convenience, but not limitation, the QWERTY keys in group 104B are arranged along arcs 1308A, 1308B, 1308C, 1308D, and 1308E (collectively, arcs 1308). For clarity of illustration, the arcs 1308 are shown only with the group of keys 104B. However, it is understood that the keys 104A may also be arranged in a plurality of arcuate configurations. It is further understood that the lines representing the horizontal rows 1302, the vertical columns 1304, and the arcs 1308 would not physically appear on the device 100, but instead may be considered guide lines that facilitate illustration and discussion. Thus, these lines are dashed in FIG. 13.

The arcs 1308 are arranged relative to a right-side point of reference $PR_R$, which is associated with the group of keys 104B. It is understood that the position of this illustrative point of reference $PR_R$ is somewhat arbitrary, and is not depicted with any degree of mathematical precision. Instead, the point of reference $PR_R$ provides an example reference point that may serve as a center point for the arcs.

Various ones of the arcs may be set at respective distances from the point of reference $PR_R$, such that the arcs are associated with different radii relative to the point of reference $PR_R$. Thus, keys placed along these various arcs are placed at radii having different lengths. The keys 104B shown in FIG. 13 may be placed at distances reachable by a user's right thumb when the device is in use. Put differently, the keys 104B may be placed within the sweep of the user's right thumb, when the user is grasping the lower right side of the device 100 such that the user's thumb pivots approximately about the point of reference $PR_R$. In this context, the arcs 1308 may be viewed as paths along which the user's right thumb may travel to select various individual keys.

Individual keys are rotated or otherwise oriented to accommodate thumb actuation throughout the arcuate sweeps of the thumbs, for example along the arcs 1308. At least some of the keys may be oriented relative to the point of reference $PR_R$, or may be oriented relative to another point of reference. The various keys themselves may be associated with respective center points (e.g., the center point C), such that these center points lie generally on one of the arcs 1308. Keys along a given arc are aligned in different columns. Recall from the above discussion that keys in different columns are oriented at different angles relative to the horizontal rows 1302. Thus, keys arranged along a given arc are oriented at different angles relative to the horizontal rows 1302. In other instances, the keys along a given arc are oriented somewhat non-uniformly along the arc. Keys 1310A and 1310B along the arc 1308A provide an example of such non-uniform orientations.

The left-side group of keys 104A may be visualized as a mirror image of the right-side group of keys 104B. Thus, the QWERTY keys in the left-hand group 104A are arranged along corresponding arcs similar to the arcs 1308 described with the right-hand group 104B. To avoid complicating the illustration of the keys 104A in FIG. 13, the arcs are omitted.

A point of reference $PR_L$ is associated with the keys 104A. When the user is grasping the lower left side of the device 100, the user's left thumb pivots approximately about the point of reference $PR_L$ to reach the keys 104A. Thus, the user's left thumb may travel along arcuate paths similar to the arcs 1308 to select various individual keys. The two points of reference $PR_R$ and $PR_L$ may be located, respectively, in the lower left and lower right corners of the device 100 when the device is oriented for viewing by the user. Thus, the two points of reference $PR_R$ and $PR_L$ are spaced from one another on the device 100.

Figure 14:
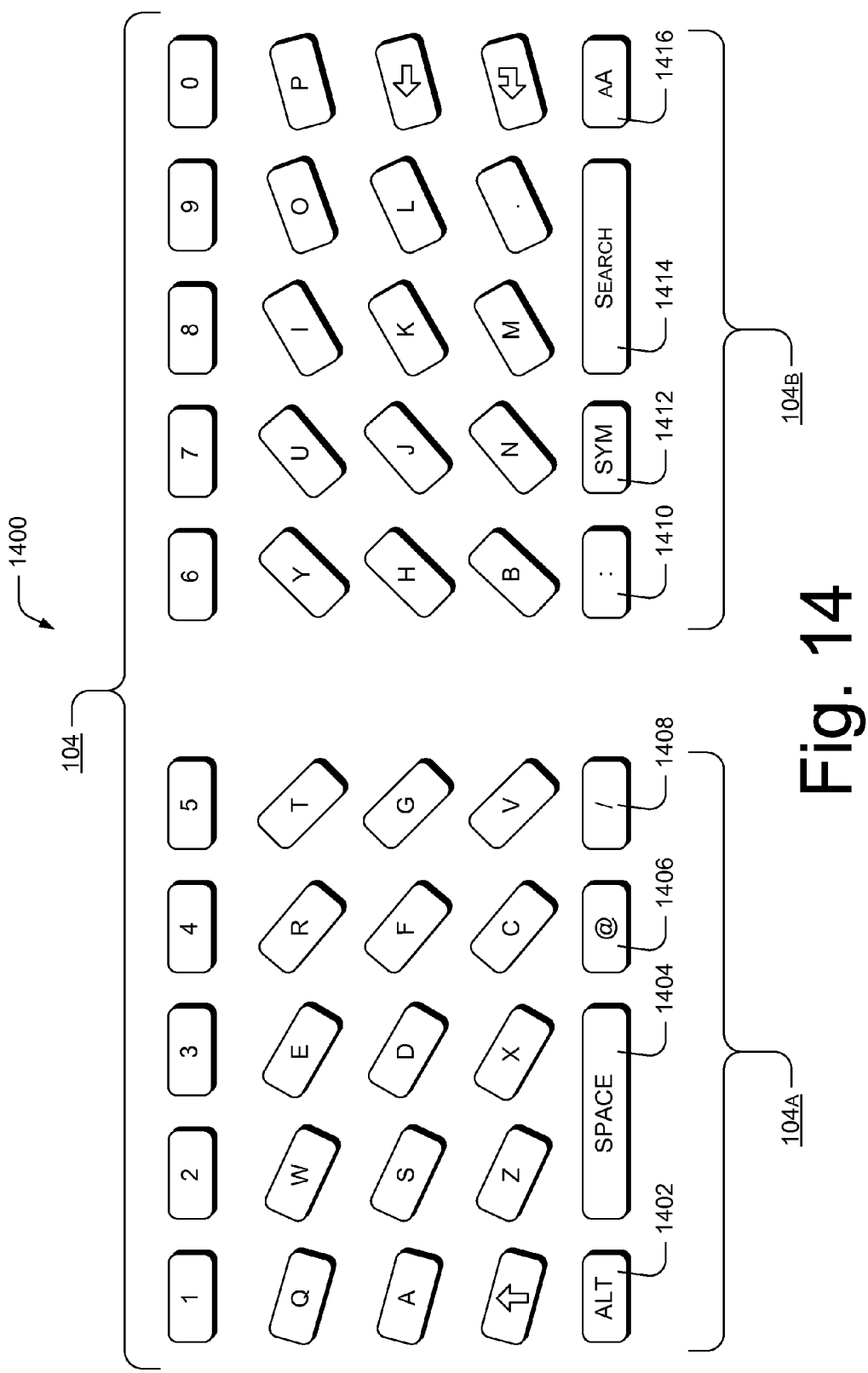
FIG. 14 is a block diagram of another illustrative configuration for the keyboard, with example labels affixed to various keys.

FIG. 14 illustrates another configuration 1400 for the keyboard 104, with example labels affixed to various keys. It is noted that the arcuate and the row-column configurations of the keys are generally similar to that shown in FIG. 13. However, to promote clarity, the lines representing the arcs, rows, and columns are omitted from FIG. 14 since they were shown in FIG. 13. The description related to the arcs, rows, and columns from FIG. 13 applies equally to FIG. 14. Illustrative functions that may be performed by various keys are now described.

A user may press and hold an ALT key 1402 to invoke an alternative function associated with any of the other keys of the keyboard 104. For example, to conserve space and to maximize the number of different functions that may be performed using the keyboard 104, one or more given keys in the keyboard 104 may be associated with multiple functions. Such keys may include respective labels designating these multiple functions. A first function may be accessed by pressing the given key alone. At least one more function may be accessed by pressing and holding the ALT key 1402, and then pressing the given key.

The user may press a "space" or "space-bar" key 1404 to enter a space into a text string being edited by a user. The "@" key 1406, the "/" key 1408, and the ":" key 1410 may enable the user to quickly enter e-mail addresses, HTTP addresses, or any other text strings that include these three characters.

The user may press a "SYM" key 1412 to bring up a menu of symbols, from which the user may select for entry into a text string. The menu of symbols may be populated with a plurality of symbols that are most likely to be selected by the user.

The user may press a "SEARCH" key 1414 to bring up a search menu, from which the user may initiate keyword searches. The user may search content stored locally on the device 100, or may search content stored externally to the device 100.

The user may press a key 1416 to change a font size in which the content is presented in the content display 106. The key 1416 may be implemented so that as the user repeatedly presses it, the font size may, for example, become progressively larger or smaller. The key 1416 may also be implemented so that when a maximum or minimum size is reached, the font size may revert, respectively, to a minimum size or a maximum size to allow the user to repeat this process until a desired size is reached.

Dual Display

Figure 15:
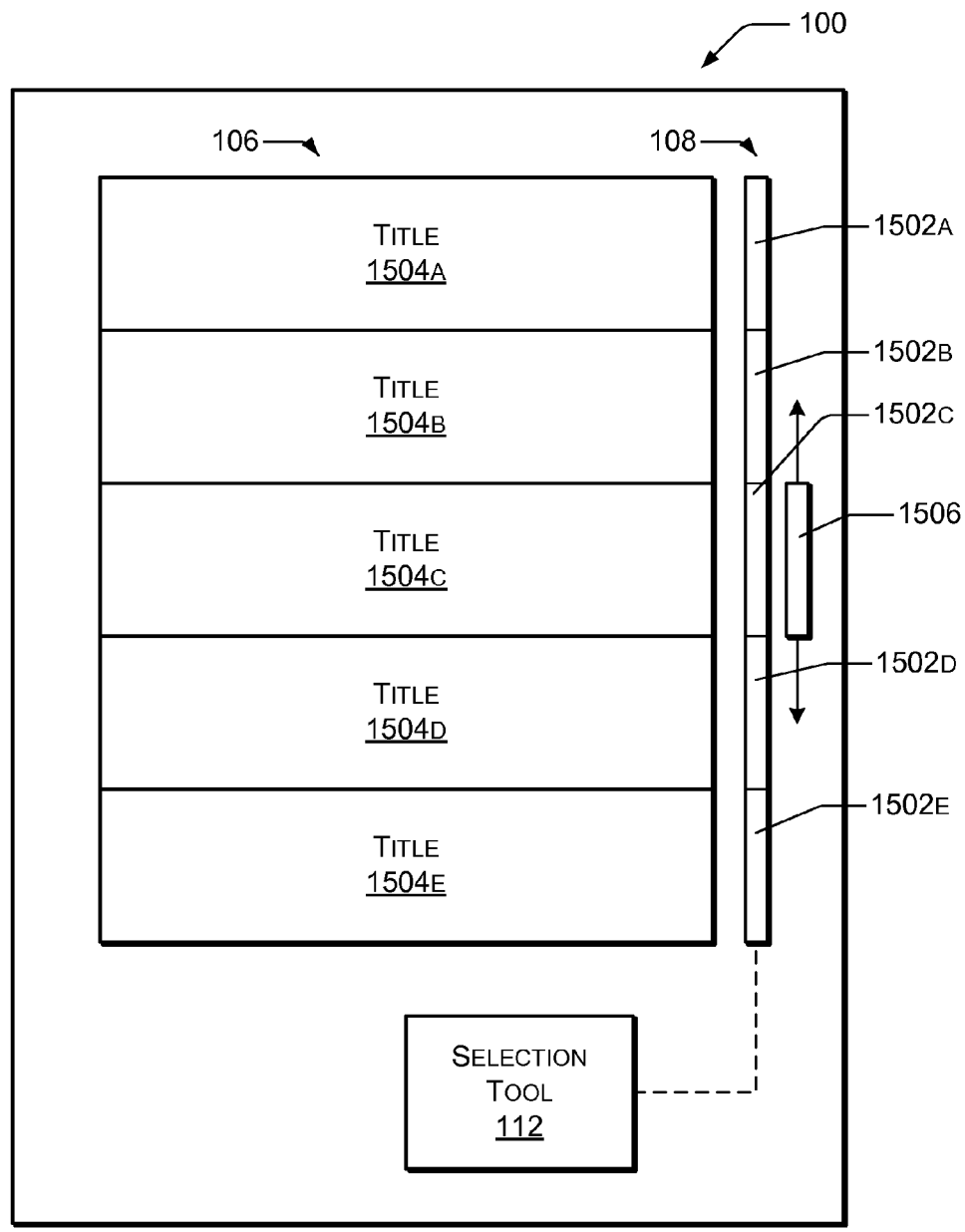
FIG. 15 illustrates a dual display system employed by the eBook reader device, where the dual display system includes a content display and a narrow display.

FIG. 15 illustrates the dual display system employed by the eBook reader device. The dual display system may include the content display 106 and the narrow display 108. As described above, the content display 106 is adapted for displaying visible representations of textual or graphic content, such as contents of an electronic book in digital form. For convenience only, the content display 106 is shown in a generally rectangular configuration in FIG. 15. However, it is understood that the content display 106 may be implemented in any shape, and may have any ratio of height to width. Also, for stylistic or design purposes, the content display 106 may be curved or otherwise non-linearly shaped.

The device 100 may also include a second display 108 in addition to the content display 106. As shown in FIG. 15, the narrow display 108 has a height approximately equal to the height of the content display 106, but a substantially smaller width in comparison to the content display 106. As a result, the narrow display 108 has a smaller overall surface area as compared to the content display 106. In other implementations, the narrow display 108 may be wider or have different ratios of height and width. Also, in the illustrated implementation, the narrow display 108 is positioned alongside of, and parallel to, the content display 106. It is noted, however, that the narrow display 108 may be positioned in other relationships to the content display 106. For example, the narrow display 108 may be above, below, or on either side of the content display 106. Further, although the narrow display 108 is shown in a generally rectangular configuration, it may be implemented in other non-rectangular shapes. In some instances, the narrow display 108 may conform to the shape of the content display 106 as a whole, or to a part thereof.

The narrow display 108 may be located proximate the content display 106 to enable the user to input commands that are to be performed on the content shown in the content display 106. In the illustrated implementation, the narrow display 108 is aligned along one side of the content display 106 so that the user may visually relate content that is displayed in the content display 106 with corresponding areas of the narrow display 108. To facilitate this visual correlation, some implementations of the narrow display 108 may be divided into segments 1502, with each segment containing a graphic element that corresponds to a portion of the content display 106. FIG. 13 shows five representative segments, referenced at 1502A, 1502B, 1502C, 1502D, and 1502E (collectively, segments 1502). These respective segments 1502 may be responsive to user input within the segment to perform an action relating to the content that is shown in the corresponding portion of the content display 106.

FIG. 15 illustrates the content display 106 and the control display 108 as separate elements only for convenience of illustration and description, and not to limit possible implementations of the description herein. In some instances, the content display 106 and the control display 108 may be implemented as separate elements, as shown in FIG. 15. In other instances, the content display 106 and the control display 108 may be implemented as a single display, with logically separate control systems for driving the content display 106 and the control display 108.

In one implementation, the several segments 1502 within the narrow display 108 may be delineated from one another using lines or bars. These boundary lines may serve to make clearer the association between the segments and the corresponding portions of the content display 106. Assuming that the narrow display 108 is implemented with a technology that uses individually-addressable pixels, these lines or bars may be implemented by altering selected pixels to define these lines or bars.

To facilitate the foregoing functions of the content display 106 and the narrow display 108, certain implementations of the content display 106 may use display technology that provides a relatively slow rate of refresh relative to the narrow display 108. Assuming that the content display 106 would present relatively static text and graphics, this slower rate of refresh may be an acceptable trade-off against reduced power consumption. For example, if the device is an electronic book whose "pages" are turned or scrolled fairly infrequently once they are displayed, a slow rate of refresh may be acceptable. An example of suitable technology for the content display 106 is the electronic paper display technology described above.

In contrast, the narrow display 108 may be implemented with technology having a faster rate of refresh, relative to the content display 106. Even if the per-unit-area power consumption rate of the narrow display 108 is higher than that of the content display 106, the smaller surface area of the narrow display 108 may negate this issue somewhat, so that the overall power consumption of the device 100 is nevertheless acceptable. The narrow display 108 may be implemented using, for example, LCD technology. The narrow display 108 may further be responsive to user input, whereas the content display 106 may not be responsive to user input. For instance, the narrow display 108 may be implemented with touch-sensitive technology that is responsive to stylus input and/or touch input, and may be sized as appropriate, given the mode by which the user is expected to interact with the narrow display 108.

The content display 106 may present essentially any type of textual or graphical content. As one example, in FIG. 15, the content display 106 is shown as presenting multiple titles to the user. These titles might represent, for example, titles of content that are stored on the device 100 and that are available for selection and viewing by the user, or perhaps content that is available from an online library that is accessible wirelessly or via some other connection. For example only, and not limitation, FIG. 13 shows five sample portions or elements, referenced at 1504A, 1504B, 1504C, 1504D, and 1504E (collectively, elements 1504).

Assuming that the content display 106 contains the five content elements 1504 as shown in FIG. 15, the narrow display 108 may display five corresponding segments 1502. However, it is understood that the number of segments or graphic elements 1502 in narrow display 108 may vary according to the number of elements 1504 presented in the content display 106. Also, the size of individual segments 1502 in the narrow display 108 may depend on how the elements 1504 are represented in the content display 106. As shown in FIG. 15, the graphic elements 1502 may be arranged in a column alongside the content display 106.

As one example operation, assume the user wishes to select a title associated with one of the elements 1504A-1504E in the content display 106. The user may refer to the narrow display 108 and identify the segment 1502 that corresponds to the desired title. Having done so, the user may than tap or otherwise interact (e.g., via a stylus, pointed instrument, finger, etc.) with the corresponding segment 1502 in the narrow display 108.

As another example operation, the user may operate the tool 112 to select certain segments 1502 in the narrow display 108. In one implementation, the selection tool 112 is configured to control movement of a cursor 1506 vertically within the narrow display 108 alongside the group of elements 1504. The selection tool 112 may be implemented as a rotary device, a dial, a toggle switch, or the like. As the user manipulates the tool 112, the cursor 1506 is maneuvered until it rests alongside the desired one of the segments 1502 that corresponds to the desired one of the title elements 1504.

For convenience only, FIG. 15 illustrates titles in the content display 106. However, it is noted that the content display 106 may display other subject matter without departing from the spirit and scope of the description herein. For example, the content display 106 may present menu items, lines of text, elements related to a graphical user interface (GUI), or the like.

It is noted that the space allocated to the various elements 1504 may vary, and that all elements 1504 need not be uniform in size. Some elements 1504 may be larger or smaller than others, depending on the amount of content being presented in the elements 1504. It is also noted that the segments 1502 may vary in size according to the size of the elements 1504. Finally, the size of the cursor 1506 may match the size of the segment 1502 with which it is aligned. As the cursor is moved vertically within the narrow control display 108, the size of the cursor 1506 may vary, depending on the size of the segment that the cursor is alongside.

While title selection is described in the above example, the foregoing description may be applied to enable the user to execute any number of requested operations. For example, having selected a given title for reading, the user may navigate through the selection by selecting, touching, or otherwise interacting with the segments 1502. In general, the segments 1502 may enable the user to cause some action to be performed on subject matter presented in the content display 106.

Page Turner

Figure 16:
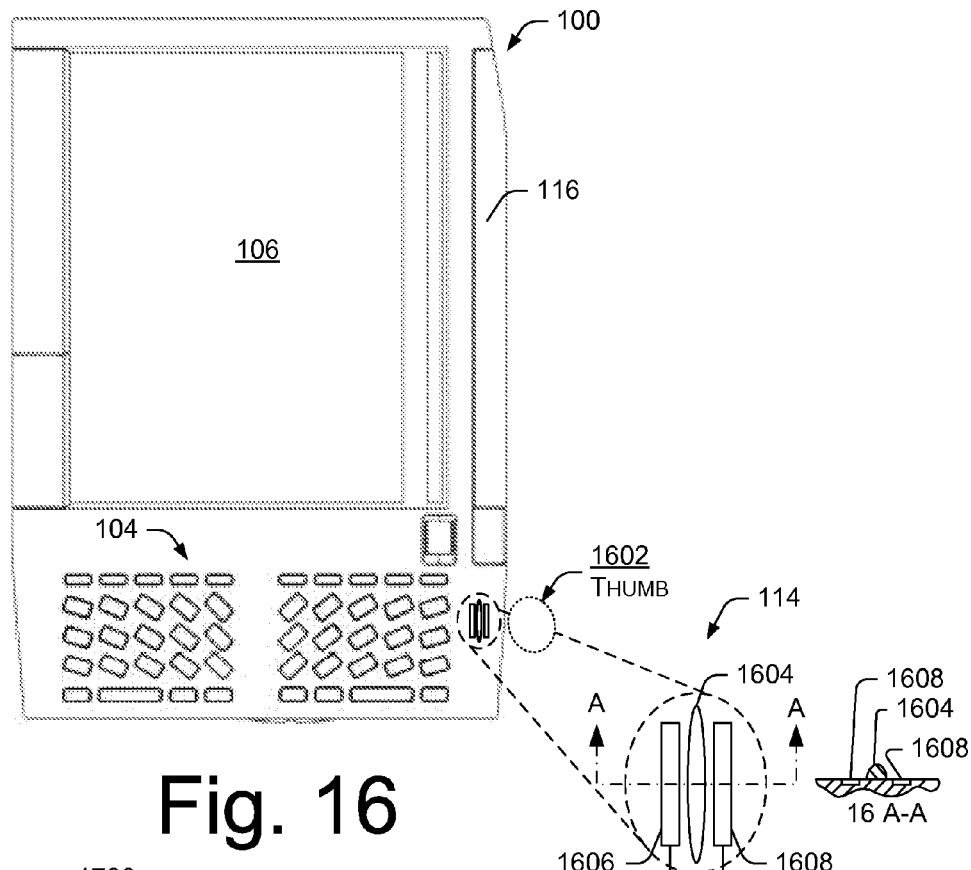
FIG. 16 illustrates a page turning mechanism of the eBook reader device in more detail.

FIG. 16 shows one implementation of the page turner in more detail. In this implementation, the page turner is embodied as the page turning mechanism 114 located in the lower right side of the reader device 100, adjacent to the keyboard 104. In this location, the user can hold the eBook reader in the left hand, and turn pages of the electronic book using his or her right hand, similar to how the user would leaf through a physical paperback book. The mechanism 114 is sized to accommodate the user's thumb 1602 (or other finger). The user turns pages of the electronic book (or other electronic content) by swiping his or her thumb 1602 across the page turning mechanism 114. A left-to-right motion directs the reader device 100 to turn the pages forward in the electronic book, and a right-to-left motion directs the device 100 to turn the pages backward in the electronic book. It is noted that the mechanism may be positioned elsewhere on the eBook reader device 100, and FIG. 16 illustrates just one example location.

Further, recall from above that a "page" as described herein may be understood as a virtual frame of the content, or a visual display window presenting the content to the user. The pages presented on the device 100 and turned using the page turning mechanism 114 may not correspond directly to the identical hard pages in the associated physical book. Depending on display capabilities, font size, and other such parameters, any given "page" displayed on the device 100 may contain more or less text/graphics than the corresponding hard page. Thus, the page turning mechanism 114 turns pages in the sense of changing from one display frame to another.

The page turning mechanism 114 includes at least one sensor and at least one tactile member. In the FIG. 16 illustration, the mechanism 114 has a single tactile member 1604 positioned between two sensors 1606 and 1608. The tactile member 1604 provides tactile feedback as the user swipes his or her thumb 1602 over the page turning mechanism 114. In this example, the tactile member 1604 is a ridge that projects outward from the surface, as illustrated in the cross-section taken along lines A-A (and labeled 16 A-A). The tactile member 1604 simulates the riffle sensation experienced when a user flips through paper pages of a physical book. The ridge member 1604 may be implemented using hard materials, such as plastic, or may alternatively be configured as a flexible member using, for example, an elastomeric material. In addition, the ridge member 1604 may also have a surface construction or structure that provides additional tactile sensation when a user passes his or her thumb over the mechanism 114. In this manner, the surface may include small ridges, uneven contour, or other configurations to provide a tactile feedback. Furthermore, the surfaces of sensors 1606 and 1608 may also possess a non-smooth surface that provides a tactile sensation. More generally, the ridge members and sensors have surfaces that when stroked by a user's finger, impart a sensation of leafing through paper pages in a physical book.

The sensors 1606 and 1608 detect speed and direction of the user's thumb or finger. When passing over the mechanism 114 in a left-to-right swipe, the left-side sensor 1606 detects the thumb first, followed by the right-side sensor 1608. Conversely, when passing over the mechanism 114 in a right-to-left swipe, the right-side sensor 1608 detects the thumb first, followed by the left-side sensor 1608. In one implementation, the sensors are capacitance sensors that detect presence of gesture proximity via changes in capacitance. The capacitance sensors generate signals in response to changes in capacitance. Other types of sensors that may be used include resistive sensors, force or strain gauge sensors, and optical sensors. When implemented using certain alternative sensors, such as resistive and force sensors, the page turning mechanism 114 may also be configured to detect pressure in addition to direction and speed.

The signals generated by the sensors' detection of thumb movement are passed to a page turn detector 216. From these signals, the detector 216 determines direction of the thumb movement as a function of the order in which the sensor signals are received. For left-to-right movement, a signal from the left-side sensor 1606 will be received before a signal from the right-side sensor 1608, and vice versa for a right-to-left movement. Additionally, the page turn detector 216 can approximate the speed of the thumb movement as a function of a time difference between receipt of signals from the two sensors 1606 and 1608, with a shorter time delay indicating a faster swipe and a longer time delay indicating a slower swipe. Thus, the page turning mechanism 114 is able to detect gestures of flipping forward or backward through the book, and can advance one page at a time for a slower swipe (i.e., if the thumb speed is below a threshold) or multiple pages at a time (i.e., if the thumb speed is above a threshold). The page turn detector 216 may be implemented as an electronics component, or as software executing on the device 100. Depending upon implementations, a pressure parameter may also be provided to the page turn detector 216.

Figure 17:
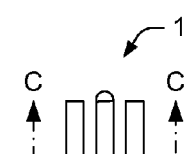
FIGS. 17-19 show different example embodiments of the page turning mechanism.
Figure 18:
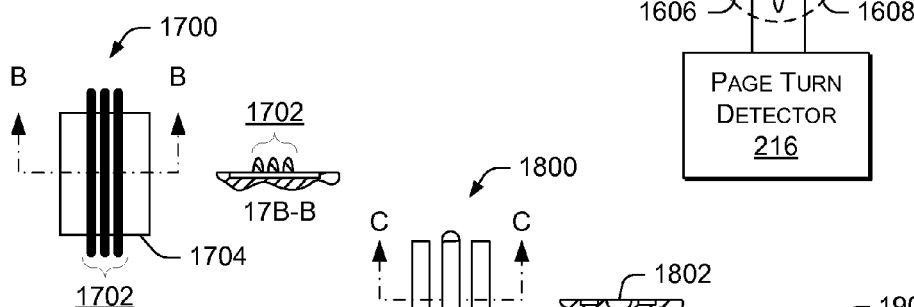
Figure 19:
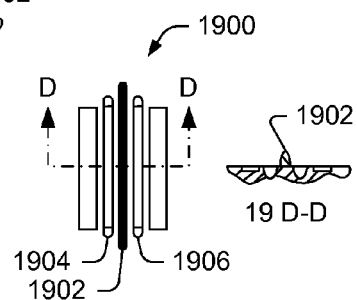

FIGS. 17-19 illustrate exemplary alternative implementations of the page turning mechanism. In FIG. 17, the mechanism 1700 has three tactile members 1702 positioned atop a single sensor 1704. In this implementation, the sensor 1704 is a resistive or force pad that detects pressure from contact or touch, and hence can detect location of the user's thumb on either side of the ridges 1702. It is noted that in other implementations, the tactile members 1702 may be positioned between two sensors, similar to that shown in FIG. 16.

The three tactile members are raised from the surface of the device, as illustrated by the cross-section taken through line B-B (and labeled 17 B-B). Page turning mechanism 1700 is similar to mechanism 114 in FIG. 16, in that the tactile feedback is provided by raised ridges. However, unlike mechanism 114, the page turning mechanism 1700 of FIG. 17 has multiple tactile members (three in this example) to further simulate the edges of paper.

FIG. 18 shows another implementation of a page turning mechanism 1800, which has a single tactile member 1802 juxtaposed between two sensors. However, unlike the ridge member of FIG. 16, the tactile member 1802 in FIG. 18 is formed as a channel or indentation into the surface of the device. As shown in the cross section taken through line C-C (and labeled 18 C-C), the tactile member 1802 has a semi-circular cavity formed in the device surface.

FIG. 19 shows yet another implementation of a page turning mechanism 1900. In this implementation, the mechanism 1900 employs a combination of raised and indented tactile members. More specifically, the mechanism 1900 includes a ridge member 1902 surrounded by indentation members 1904 and 1906. This tactile assembly is then positioned between the two sensors. A cross-sectional view taken through lines D-D (and labeled 19 D-D) shows the alternating concave-raised-concave pattern.

The implementations illustrated in FIGS. 16-19 are merely examples. Any combination of at least one tactile member and at least one sensor is possible.

Figure 20:
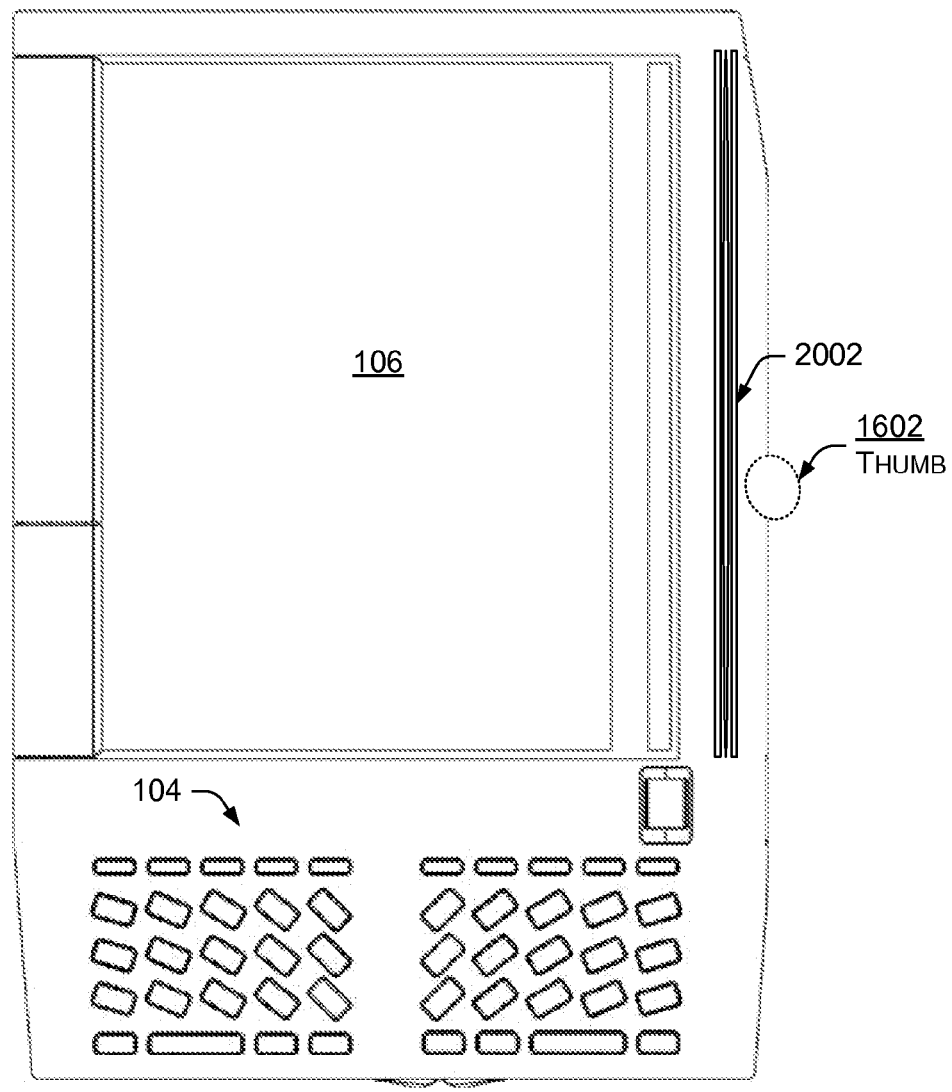
FIG. 20 illustrates an elongated page turning mechanism.

FIG. 20 shows another implementation of an elongated page turning mechanism 2002 that is sized substantially larger than a human thumb. In this example, the page turning mechanism 2002 extends approximately the height of the display 106, although other intermediate sizes are possible. The elongated page turning mechanism 2002 includes a long ridge member positioned between two sensors, similar to that shown in FIG. 16. It is noted, however, that other arrangements of one or more tactical members and one or more sensors may be used, such as those shown in FIGS. 17-19. Further, the elongated page turning mechanism 2002 replaces the control surfaces 116A and 116B in this arrangement.

The page turning mechanism 2002 may further be configured to detect the absolute position of the user's thumb or finger (or other pointing element) along the height of the sensor. In this manner, the page turning mechanism may be used to perform other functions than turning pages of content, such as highlighting a portion of text, selecting a highlighted section, or selecting a menu option when a menu is depicted on the display. Thus, although the page turning mechanisms 114 and 2002 are described as being configured to turn pages, they may be configured to perform other functions in response to detecting gestures.

Figure 21:
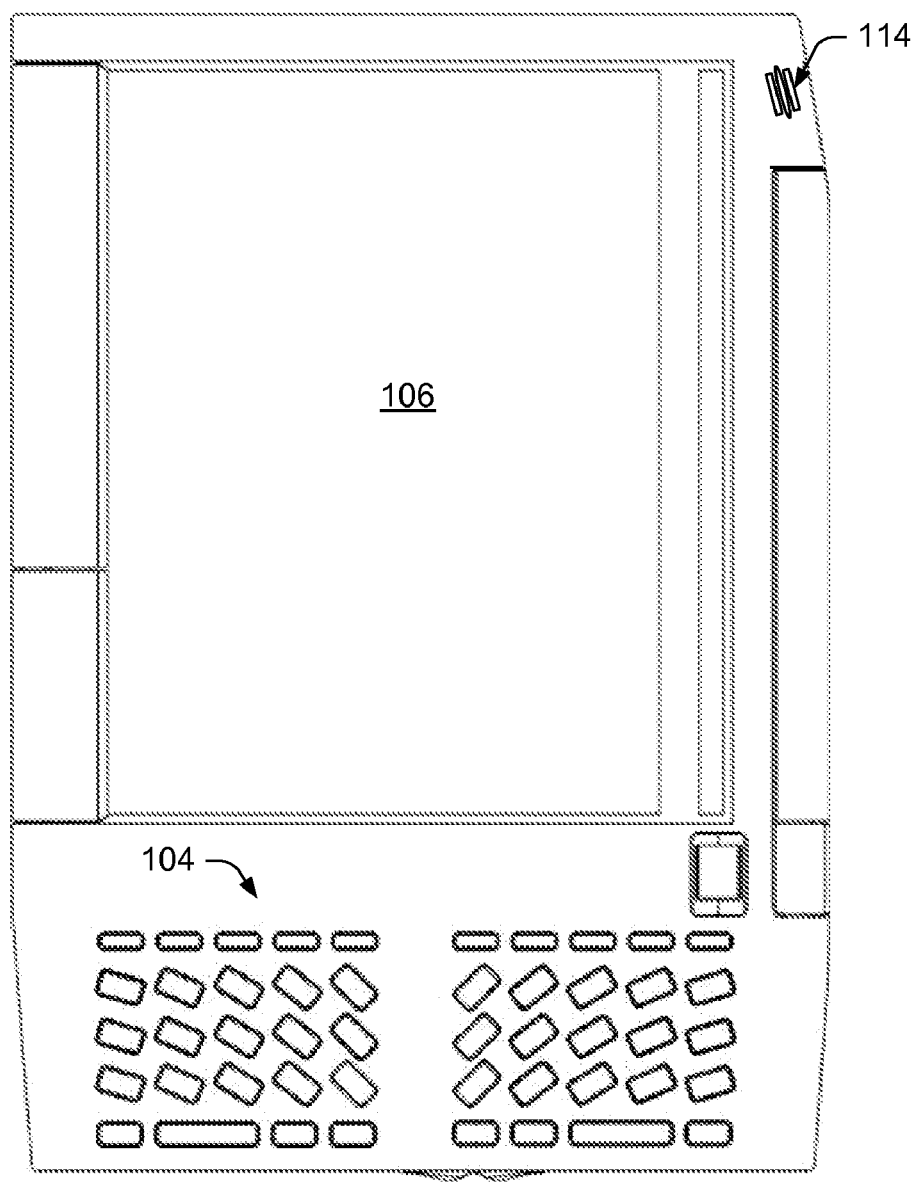
FIG. 21 shows another implementation in which the page turning mechanism is positioned near an upper right hand corner of the device.

FIG. 21 shows another implementation in which the page turning mechanism 114 is positioned at a location near the upper right hand corner. In this position, the mechanism 114 resembles a bookmark referencing a page or location in the eBook to which the reader can return. It is noted that the page turning mechanism may be located in any number of areas, and those shown in FIGS. 16-21 are merely representative.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A handheld electronic reader device comprising:
an electronic display for presenting visible representations of electronic content, wherein the electronic display has a first refresh rate;
a second display positioned substantially coplanar with the electronic display for presenting visual elements to aid in navigating the electronic content presented on the electronic display, wherein the second display has a second refresh rate that is faster than the first refresh rate; and
a mechanism for facilitating navigation of the electronic content using the visual elements in the second display.

2. The handheld electronic reader device of claim 1, wherein the electronic display is for presenting textual content.

3. The handheld electronic reader device of claim 1, wherein the electronic display is for presenting graphic content.

4. The handheld electronic reader device of claim 1, wherein the mechanism comprises at least one of a thumbwheel, a button, or a joystick.

5. The handheld electronic reader device of claim 1, wherein the electronic display is capable of presenting a plurality of titles, and wherein the second display is capable of presenting a plurality of corresponding visual elements that enable selection of one of the titles.

6. The handheld electronic reader device of claim 1, wherein the electronic display is capable of presenting a plurality of menu items, and wherein the second display is capable of presenting a plurality of corresponding visual elements that enable selection of one of the menu items.

7. The handheld electronic reader device of claim 1, wherein the second display is responsive to tactile commands entered using a stylus, a finger, a scroll wheel, or a page turner.

8. A handheld electronic device comprising:
a first display for presenting visible representations of content; and
a second display of a different display type than that of the first display, wherein the second display conforms to a shape of the first display and enables a user to input commands to be performed on the content shown in the first display.

9. The handheld electronic device of claim 8, wherein the first display is for presenting textual content or graphic content.

10. The handheld electronic device of claim 8, wherein the first and second displays have different refresh rates.

11. The handheld electronic device of claim 8, wherein the first display is substantially coplanar with the second display.

12. The handheld electronic device of claim 8, wherein the first display is above or below the second display.

13. The handheld electronic device of claim 8, wherein the first display is adjacent to the second display.

14. The handheld electronic device of claim 8, wherein the first display comprises an electronic paper display and the second display comprises a display other than an electronic paper display.

15. A device comprising:
a housing;
a first display disposed in the housing to present content, the first display having a first refresh rate; and
a second display disposed in the housing above or below the first display to facilitate navigation of the content presented on the first display, the second display having a second refresh rate that is faster than the first refresh of the first display.

16. The device of claim 15, wherein the second display is touch-sensitive and is responsive to touch input.

17. The device of claim 15, wherein the second display is adjacent to the first display.

18. The device of claim 15, wherein the second display comprises one of an organic LED display, a TFT display, or an LCD display.

19. The device of claim 15, wherein the second display conforms to a shape of the first display.

20. The device of claim 15, wherein the first display and the second display are implemented as a single display, with logically separate control systems for driving the first display and the second display.

* * * * *